United States Patent
van Erven et al.

(10) Patent No.: US 11,996,607 B2
(45) Date of Patent: May 28, 2024

(54) SPATIAL ANTENNA DIVERSITY TECHNIQUES

(71) Applicant: Sonos, Inc., Santa Barbara, CA (US)

(72) Inventors: Niels van Erven, Agoura Hills, CA (US); Kasra Payandehjoo, Malden, MA (US); Michael Frey, Tyngsboro, MA (US); Anthony Maglio, Boston, MA (US); Ron Roberts, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/058,342

(22) Filed: Nov. 23, 2022

(65) Prior Publication Data
US 2023/0105588 A1      Apr. 6, 2023

Related U.S. Application Data

(63) Continuation of application No. 17/243,054, filed on Apr. 28, 2021, now Pat. No. 11,515,620, which is a
(Continued)

(51) Int. Cl.
*H01Q 1/22* (2006.01)
*G06F 3/16* (2006.01)
(Continued)

(52) U.S. Cl.
CPC .......... *H01Q 1/2291* (2013.01); *G06F 3/165* (2013.01); *H01Q 1/273* (2013.01); *H04B 7/0868* (2013.01);
(Continued)

(58) Field of Classification Search
CPC .. H04R 1/1066; H04R 1/1016; H04R 1/1075; H04R 1/00; H04R 1/02; H04R 1/10;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.
(Continued)

*Primary Examiner* — Ahmad F. Matar
*Assistant Examiner* — Sabrina Diaz
(74) *Attorney, Agent, or Firm* — Finch & Maloney PLLC

(57) ABSTRACT

Embodiments disclosed herein include headphone devices with spatially diverse antennas employing multiple operational modes and antenna switching policies. The headphone device may identify a current mode of operation and wirelessly communicate with at least one external device based at least in part on the current mode of operation. Further, operating in a first mode of operation, the headphone device may cause switching circuitry to selectively couple a first antenna to the common port in accordance with a first antenna switching policy. While operating in the second mode of operation, the headphone device may cause circuitry to selectively couple a second antenna to the common port in accordance with a second antenna switching policy that is different from the first antenna switching policy.

20 Claims, 15 Drawing Sheets

Related U.S. Application Data continuation of application No. 16/844,682, filed on Apr. 9, 2020, now Pat. No. 10,998,615.

(60) Provisional application No. 62/833,373, filed on Apr. 12, 2019, provisional application No. 62/883,535, filed on Aug. 6, 2019.

(51) Int. Cl.
  *H01Q 1/27* (2006.01)
  *H04B 7/08* (2006.01)
  *H04R 1/10* (2006.01)

(52) U.S. Cl.
  CPC ......... *H04R 1/1008* (2013.01); *H04R 1/1016* (2013.01); *H04R 1/1041* (2013.01); *H04R 1/105* (2013.01); *H04R 2201/028* (2013.01); *H04R 2420/07* (2013.01)

(58) Field of Classification Search
  CPC ...... H04R 5/033; H04R 25/00; H04R 25/554; H04R 25/65; H04R 2201/10; H04R 2225/031; H04R 2225/025; H04R 2225/51
  USPC .................................. 381/74, 370, 182, 380
  See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,561,903 | B2 | 7/2009 | Estrada |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,323,404 | B2 | 4/2016 | Calatayud et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Sely et al. |
| 2003/0157951 | A1 | 8/2003 | Hasty, Jr. |
| 2004/0024478 | A1 | 2/2004 | Hans et al. |
| 2006/0166715 | A1* | 7/2006 | Van Engelen ...... H04M 1/6033 455/575.2 |
| 2007/0142944 | A1 | 6/2007 | Goldberg et al. |
| 2007/0173300 | A1* | 7/2007 | Estrada .................. H04M 1/05 455/575.2 |
| 2009/0185702 | A1 | 7/2009 | Estrada et al. |
| 2011/0116675 | A1 | 5/2011 | Terlizzi et al. |
| 2014/0187179 | A1 | 7/2014 | Ferguson |
| 2016/0248281 | A1 | 8/2016 | Baden et al. |
| 2016/0254850 | A1 | 9/2016 | Chen et al. |
| 2016/0302029 | A1* | 10/2016 | Broadley ............ H04M 1/6058 |
| 2018/0191421 | A1 | 7/2018 | Seo et al. |
| 2018/0323506 | A1 | 11/2018 | Van Erven et al. |
| 2019/0373350 | A1 | 12/2019 | Yuen et al. |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Aug. 24, 2020, issued in connection with U.S. Appl. No. 16/844,682, filed Apr. 9, 2020, 16 pages.
Non-Final Office Action dated Apr. 29, 2022, issued in connection with U.S. Appl. No. 17/243,054, filed Apr. 28, 2021, 16 pages.
Notice of Allowance dated Sep. 22, 2022, issued in connection with U.S. Appl. No. 17/243,054, filed Apr. 28, 2021, 5 pages.
Notice of Allowance dated Jan. 5, 2021, issued in connection with U.S. Appl. No. 16/844,682, filed Apr. 9, 2020, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

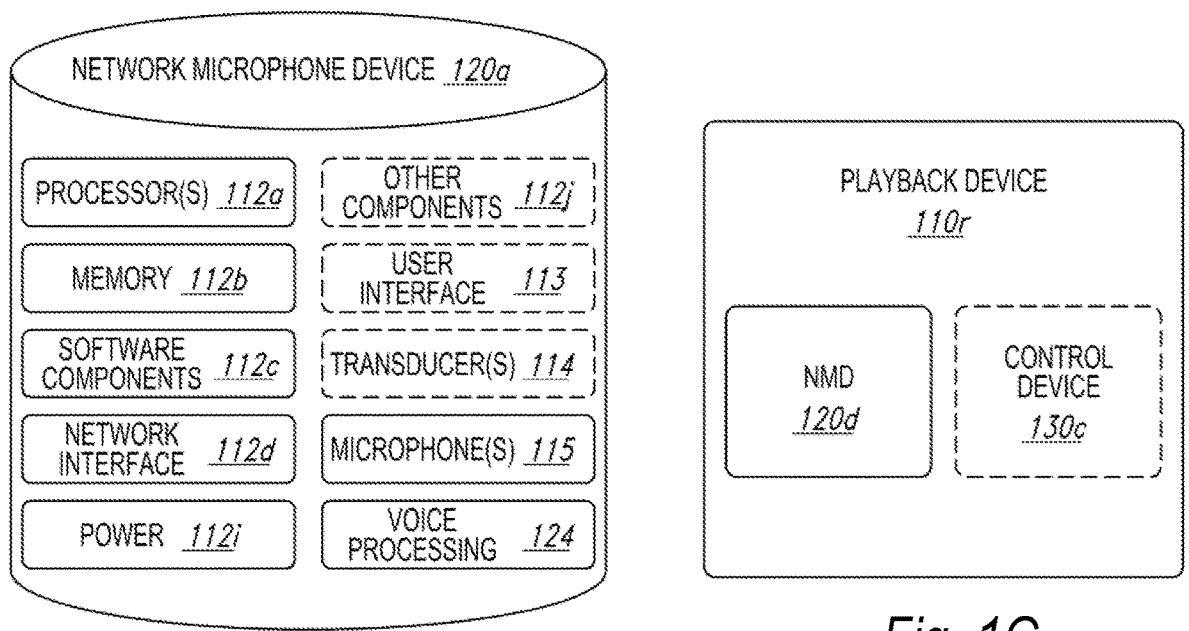
Fig. 1F
Fig. 1G
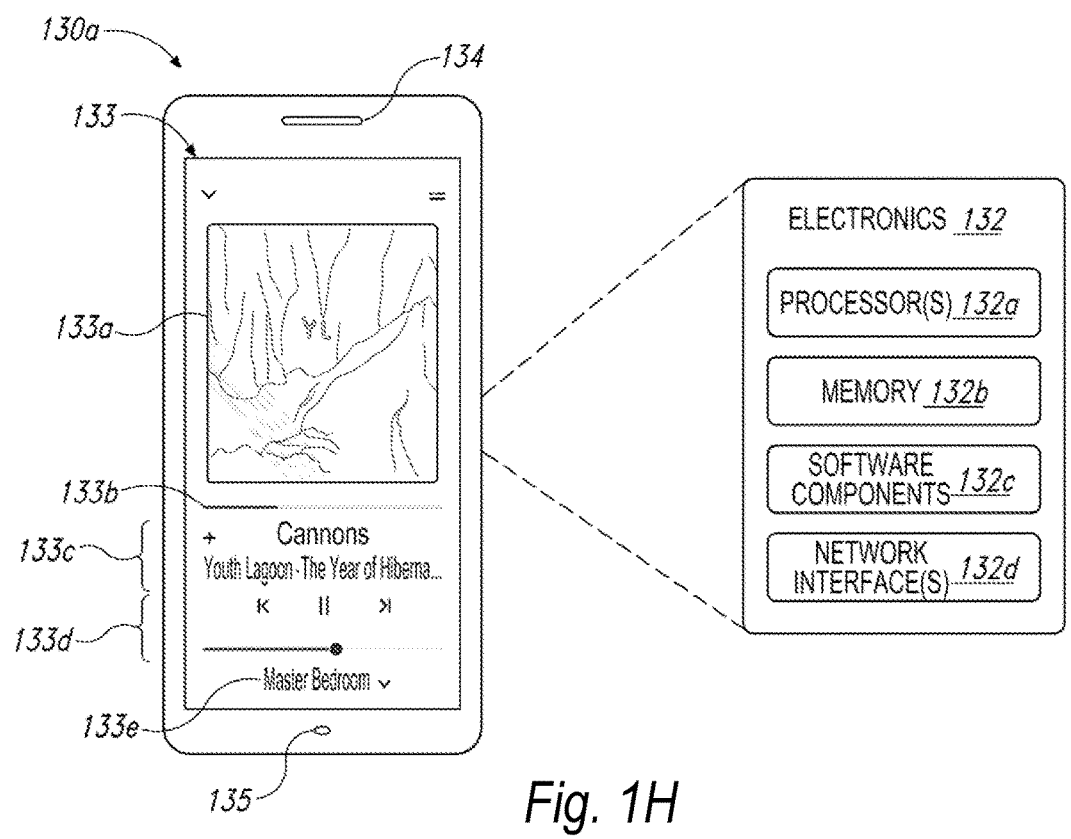
Fig. 1H

SPATIAL ANTENNA DIVERSITY TECHNIQUES

CROSS REFERENCE TO RELATED APPLICATIONS

This application claims priority to and is a continuation of U.S. patent application Ser. No. 17/243,054 filed on Apr. 28, 2021, which claims priority to and is a continuation of U.S. patent application Ser. No. 16/844,682, now U.S. Pat. No. 10,998,615, filed on Apr. 9, 2020, each of which is incorporated herein by reference in its entirety.

U.S. patent application Ser. No. 16/844,682 claims priority to U.S. Provisional Patent Application No. 62/833,373, filed on Apr. 12, 2019, titled "CABLE ASSEMBLY FOR HEADPHONES," and U.S. Provisional Patent Application No. 62/883,535, filed on Aug. 6, 2019, titled "SPATIAL ANTENNA DIVERSITY TECHNIQUES FOR HEADPHONE DEVICES," each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
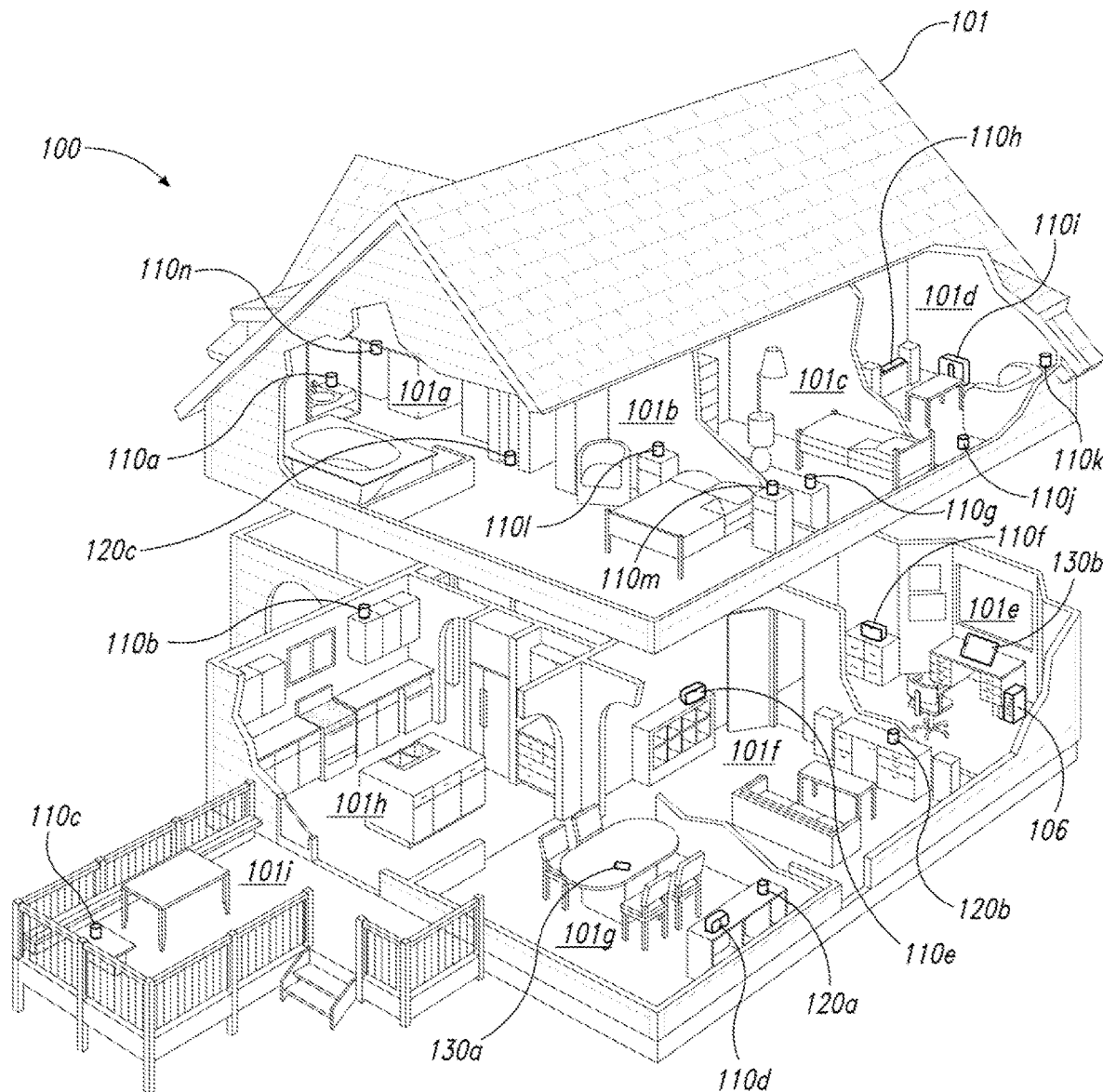
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Consumers typically expect BLUETOOTH enabled devices, such as BLUETOOTH headphones, to have a limited communication range. For example, consumers expect that the music streaming from their smartphone to a pair of BLUETOOTH headphones will dropout if they leave the BLUETOOTH headphones on as they walk away from their smartphone (e.g., they walk out of the room without their smartphone). As a result, consumers generally expect that they need to keep a pair of electronic devices that communicate via BLUETOOTH within close range of each other (e.g., kept within about 5-15 feet of each other) to maintain the connection. Given the small range expectation for BLUETOOTH headphones, conventional designs for such BLUETOOTH headphones typically only employ a single antenna that is integrated into the same earpiece as the communication circuitry (e.g., the BLUETOOTH receiver).

Consumers, however, have significantly higher range expectations for Wi-Fi enabled devices than for BLUETOOTH enabled devices. For example, consumers expect a Wi-Fi enabled tablet computer to be able to access the Internet via their wireless access point from every room in their home. As a result, a consumer would expect a Wi-Fi enabled headphone set to have the same type of reliable Internet connection to their wireless access point that they experience while using a tablet computer. Such expectations require a Wi-Fi enabled device to successfully receive and transmit information at significantly further ranges compared to BLUETOOTH enabled devices, including through walls, floors and/or other objects that tend to attenuate and/or reflect electromagnetic waves (e.g., concrete, metal, etc.).

One challenge with a Wi-Fi enabled device in a headphone form factor is the electrical properties of the human head. For example, human heads significantly reflect and/or attenuate electromagnetic waves at the frequencies employed for Wi-Fi communication (e.g., 2.4 Gigahertz (GHz) and 5 GHz). As a result, an antenna disposed in an earpiece on one side of a user's head has a significant null area through which wireless performance is severely compromised. Such a large and deep null area is not typically encountered in traditional Wi-Fi enabled devices, such as laptop computers. In the context of BLUETOOTH headphones, the range expectation of users is so small (e.g., because the smartphone that is providing the audio via BLUETOOTH is typically within about 5 feet of the headphones) that a single antenna with a large null area is still sufficient to provide an acceptable user experience despite the above-described radiation pattern nulls introduced by a human head. Employing a conventional single antenna design for a Wi-Fi enabled headphone, however, does not provide a stable connection at the ranges a consumer would typically expect for a Wi-Fi enabled device.

One approach to improve the wireless performance of headphones is to integrate multiple antennas into the headphone including at least one antenna in each earpiece to provide spatial and pattern diversity. Due to the high attenuation of electromagnetic waves travelling through human head, integrating multiple antennas in different parts of a headphone (e.g., in particular left and right sides of the head) can result in antenna patterns with excellent pattern diversity (e.g., complementary antenna patterns). Incorporating an additional antenna into an earpiece that is remote from the communication circuitry (e.g., in an earpiece that does not comprise the wireless receiver) raises a host of new technical challenges. For example, one challenge in incorporating an additional antenna that is remote from the communication circuitry (e.g., including the wireless receiver) is enabling communication and switching between the antennas in a manner suitable for various modes of operation, e.g., switching between 2.4 GHz Wi-Fi and 5.0 GHz Wi-Fi operation, or switching between BLUETOOTH and 2.4 GHz or 5.0 GHz Wi-Fi operation. Such different modes of operations may have different technical requirements (e.g., different latency requirements, range requirements, channel characteristics, etc.) and be employed by users in different environments and/or use cases. For example, in WI-FI operation the headphone may typically be used in an indoor environment that exhibits a particular set of characteristics (e.g., wireless signal reflections off of solid objects such as walls and ceilings are common) while in BLUETOOTH operation the headphone may typically be used in an outdoor environment that exhibits a substantially different set of characteristics (e.g., wireless signal reflections off of solid objects may be minimal).

Accordingly, aspects of the present disclosure relate to a headphone device with spatially diverse antennas employing various modes of operation, each mode with an associated antenna switching policy or scheme. In some embodiments, for example, a headphone device comprises a first earpiece and a second earpiece, a first antenna at least partially disposed in the first earpiece, and a second antenna at least partially disposed in the second earpiece. Further, the headphone device includes switching circuitry coupled to the first antenna and the second antenna, wherein the switching circuitry includes a common port and wherein the switching circuitry is configured to selectively couple the common port of the switching circuitry to either the first antenna or the second antenna. The headphone device further includes communication circuitry coupled to the common port of the switching circuit, wherein the communication circuitry is configured to, among other functions, (i) identify a current mode of operation from a plurality of modes of operation including a first mode of operation and a second mode of operation and (ii) cause the headphone device to wirelessly communicate with at least one external device based at least in part on the current mode of operation. In some embodiments, causing the headphone device to wirelessly communicate includes, among other functions (i) while the current mode of operation is the first mode of operation, causing the switching circuitry to selectively couple either the first antenna or the second antenna to the common port of the switching circuitry in accordance with a first antenna switching policy, and (ii) while the current mode of operation is the second mode of operation, causing the switching circuitry to selectively couple either the first antenna or the second antenna to the common port of the switching circuitry in accordance with a second antenna switching policy that is different from the first antenna switching policy.

Figure 8A:
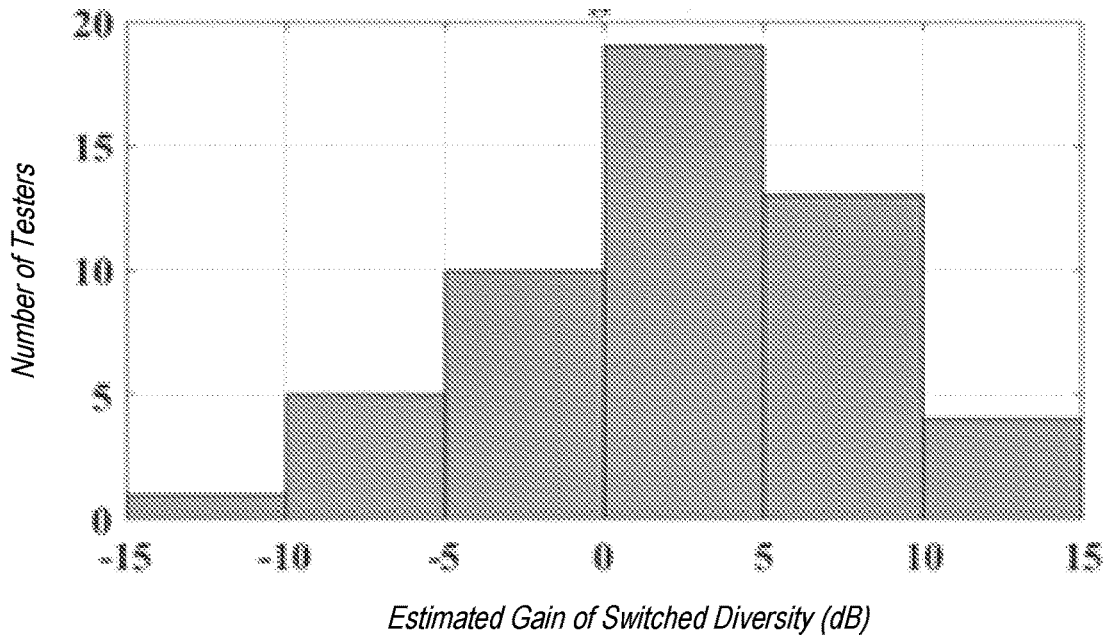
FIG. 8A is a histogram depicting the estimated performance improvement provided by the antenna switching techniques described herein for a set of test users.
Figure 8B:
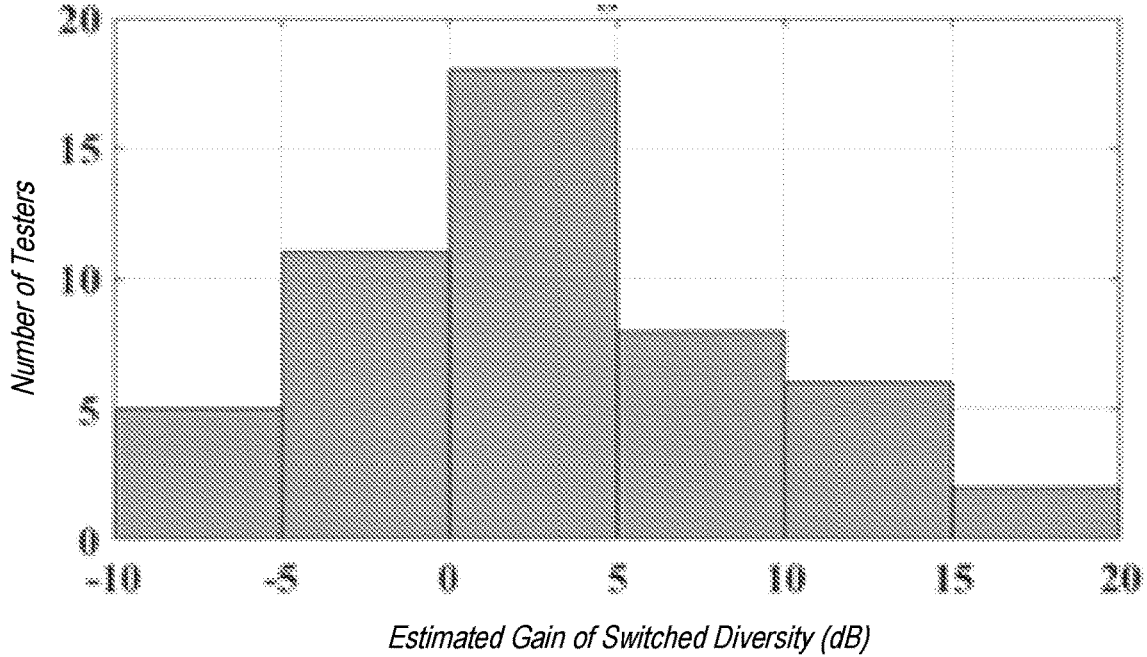
FIG. 8B is another histogram depicting the estimated performance improvement provided by the antenna switching techniques described herein for a set of test users.
Figure 8C:
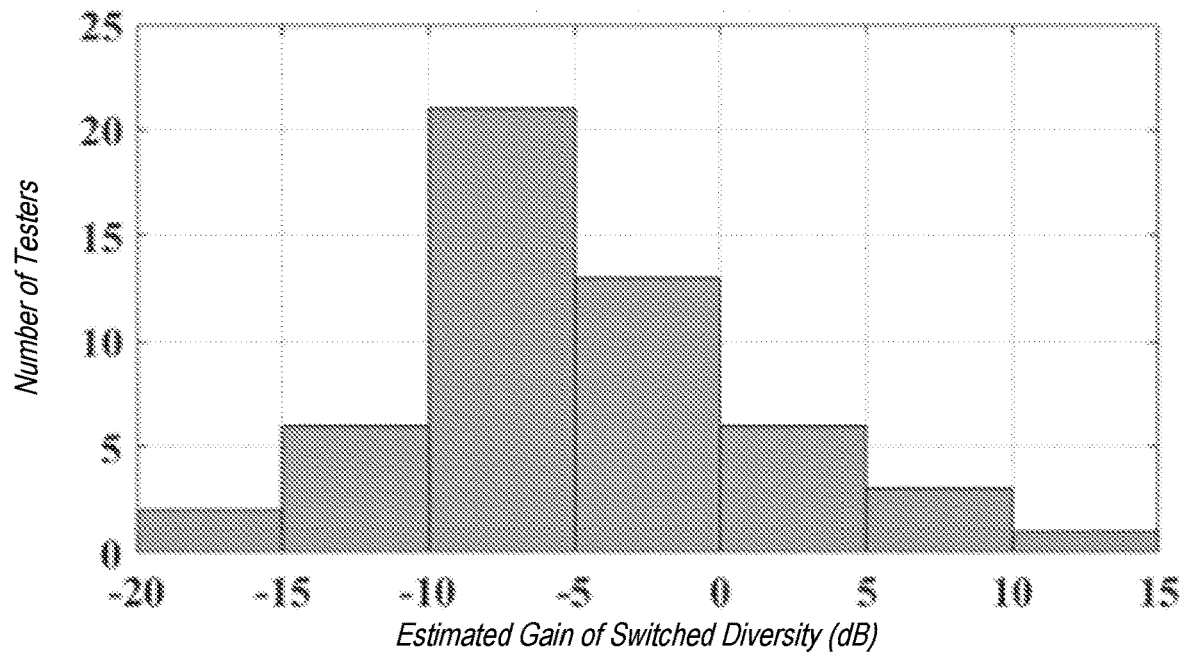
FIG. 8C is another histogram depicting the estimated performance improvement provided by the antenna switching techniques described herein for a set of test users.
Figure 8D:
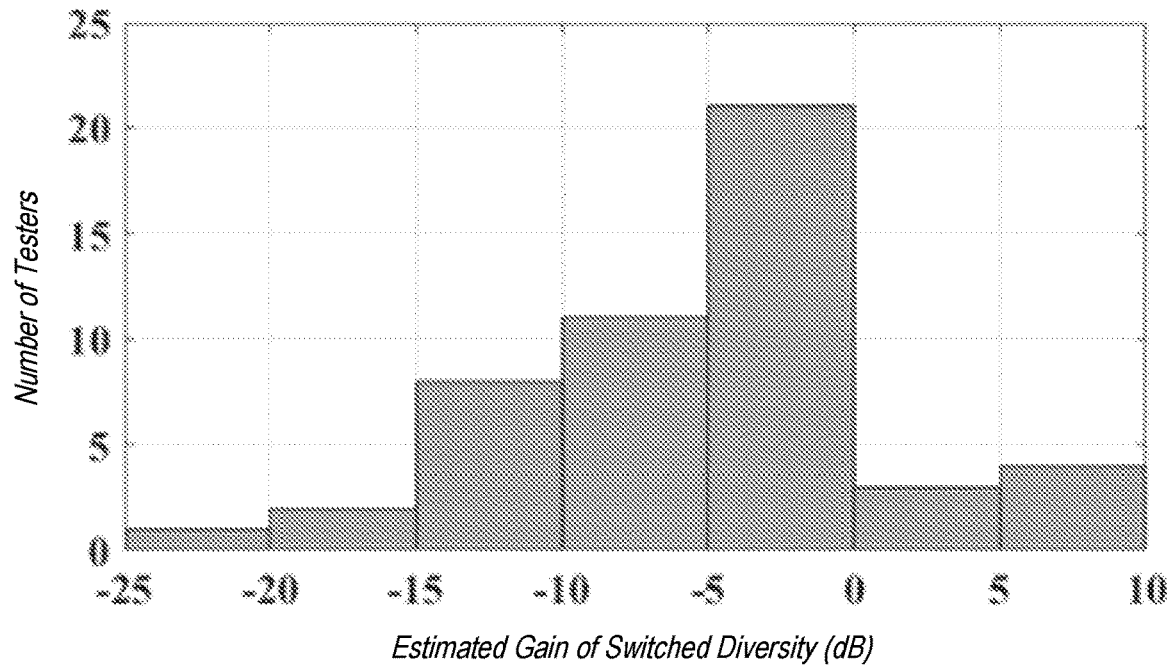
FIG. 8D is another histogram depicting the estimated performance improvement provided by the antenna switching techniques described herein for a set of test users.

It should be appreciated that the antenna switching techniques described herein to, for example, provide improved Wi-Fi performance that meets (or exceeds) user expectations may be readily applied to other wireless communication schemes to further enhance wireless performance (e.g., to substantially exceed user expectations). For example, the antenna switching techniques may be applied to improve the performance (e.g., reduce dropouts, increase range, etc.) of a BLUETOOTH communication link well beyond typical user expectations (and well beyond the performance of conventional single antenna designs). FIGS. 8A, 8B, 8C, and 8D are histograms that demonstrate the estimated performance improvement provided by employing these antenna switching techniques for a BLUETOOTH communication link relative to a conventional single antenna design. The data shown in the histograms of FIGS. 8A, 8B, 8C, and 8D was obtained by measuring the performance of a BLUETOOTH communication link between a BLUETOOTH source (e.g., a smartphone) placed in various pant pockets (e.g., front-right pocket, rear-right pocket, front-left pocket, or rear-left pocket) and a pair of headphones for over 40 different subjects. In particular, FIG. 8A shows the estimated gain improvement where the source is in a front pocket that is opposite the single antenna (e.g., antenna is positioned in the left earpiece and source is in a front-right pocket or the antenna is positioned in the right earpiece and the source is in a front-left pocket), FIG. 8B shows the estimated gain improvement where the source is in a back pocket that is opposite the single antenna (e.g., antenna is positioned in the left earpiece and source is in a back-right pocket or the antenna is positioned in the right earpiece and the source is in a back-left pocket), FIG. 8C shows the estimated gain improvement where the source is in a front pocket that is on the same side as the single antenna (e.g., antenna is positioned in the left earpiece and source is in a front-left pocket or the antenna is positioned in the right earpiece and the source is in a front-right pocket), and FIG. 8D shows the estimated gain improvement where the source is in a back pocket that is on the same side as the single antenna (e.g., antenna is positioned in the left earpiece and source is in a back-left pocket or the antenna is positioned in the right earpiece and the source is in a back-right pocket).

As shown in FIGS. 8A, 8B, 8C, and 8D, the antenna switching techniques provide the largest estimated gain improvements over a single antenna design in situations when the BLUETOOTH source is in a pocket on an opposite side of the user than the single antenna (in the single antenna design). In particular, FIGS. 8A and 8B demonstrate a gain improvement for more than 60% of the test subjects (and a substantial gain improvement of at least 5 dB for about 30% of the test subjects) relative to a single antenna design when the BLUETOOTH source is located in a pocket opposite the single antenna. As a result, the antenna switching techniques advantageously reduce the sensitivity of the BLUETOOTH communication link to the relative locations of the BLUETOOTH source and the headphone device relative to conventional single antenna designs.

Aspects of the present disclosure further describe techniques to remove the switching circuitry altogether in a headphone device employing spatially diverse antennas. Such techniques may manifest an appreciation that a pair of antennas disposed on either side of a human head (e.g., one antenna disposed in each earpiece of a headphone) have nearly complimentary radiation patterns because of the tendency of the human head to attenuate and/or reflect electromagnetic waves. Given the complimentary radiation patterns of the pair of antennas, the output from each of these antennas may be advantageously combined (e.g., non-coherently combined) by one or more splitters such that the communication circuitry effectively sees the pair of antennas as a single antenna with a more omnidirectional radiation pattern than either of the antennas in the pair individually. Thus, the switching circuitry in the headphone device may be replaced by one or more splitters that combine the outputs of a set of two or more antennas. It should be appreciated that the one or more splitters may be two-way (or bi-directional) splitters that both operate to: (1) split a signal received at a common port of the splitter into a first signal at a first port and a second signal at a second port and (2) combine signals received at the first and second ports into a combined signal at the common port.

Integrating multiple antennas that are spatially diverse into a headphone form factor may also raise the technical challenge of enabling communication between the earpieces in a manner that maintains the integrity of the weak wireless signals received via the remote antenna and permits integration into a headband of a headphone. Accordingly, aspects of the present disclosure relate to a cable assembly for integration into the headband of the wireless headphone to carry the detected wireless signals from the additional antenna to the communication circuitry. Such detected wireless signals may be carried by a coaxial cable integrated into the cable assembly with a defined impedance (e.g., 50 Ohms) to, for example, minimize reflection and/or attenuation. The cable assembly may further comprise additional cables and/or conductors separate and apart from the components employed for the detected wireless signals. For example, additional electronic components may be integrated into the earpiece that is remote from the communication circuitry to facilitate receipt of a wireless signal such as an antenna tuner and/or an amplifier (e.g., a low-noise amplifier (LNA)). In this example, the cable assembly may comprise additional conductors to carry control signals to enable control of such additional electronic components in the earpiece that is remote from the communication circuitry.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1H.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
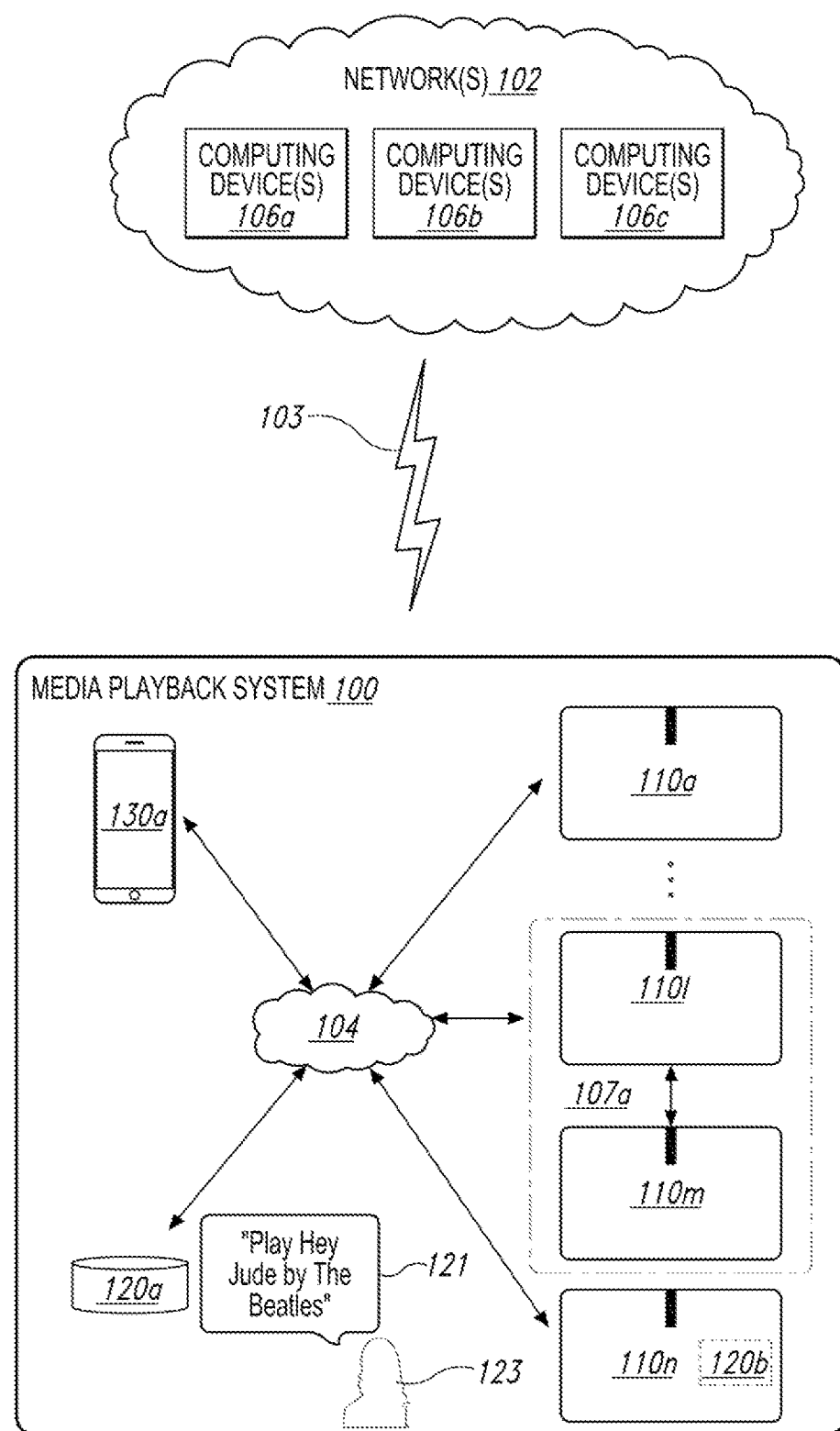
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, " " can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
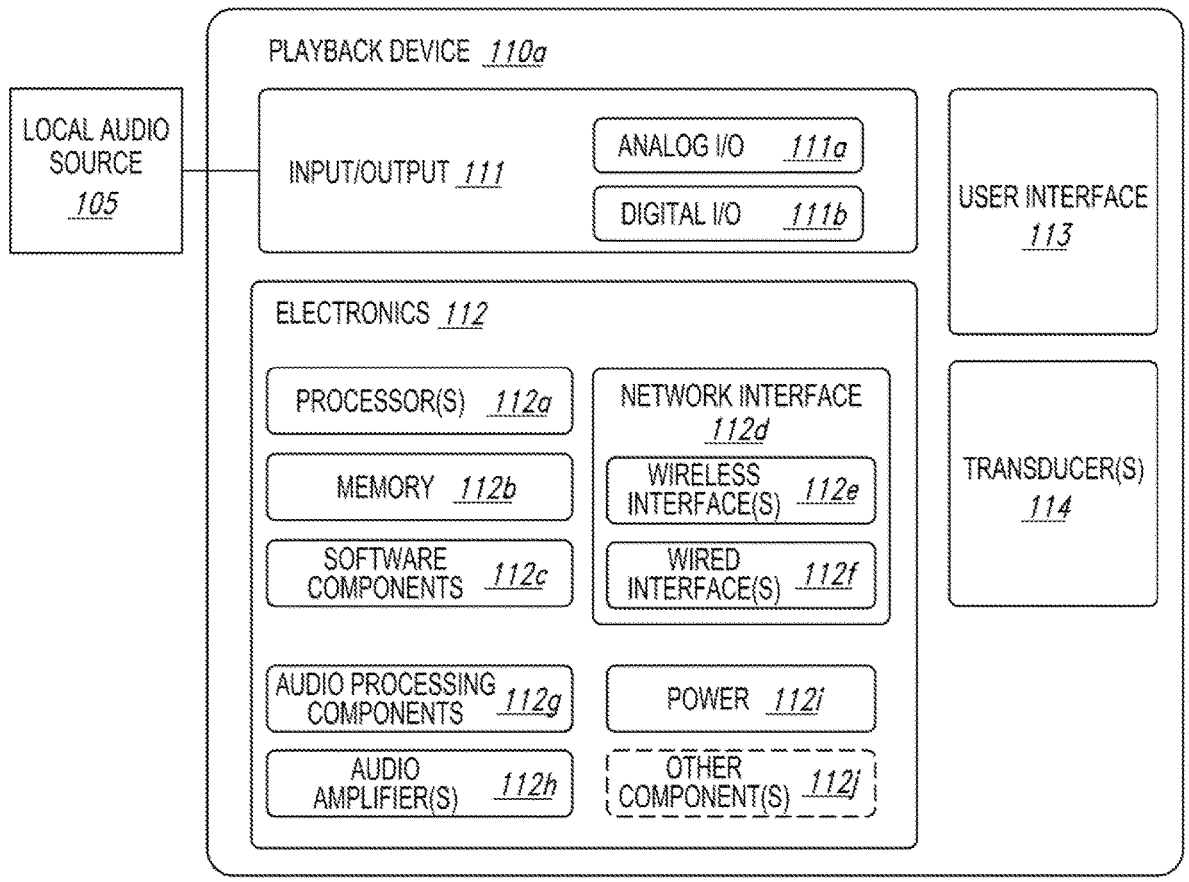
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/ output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
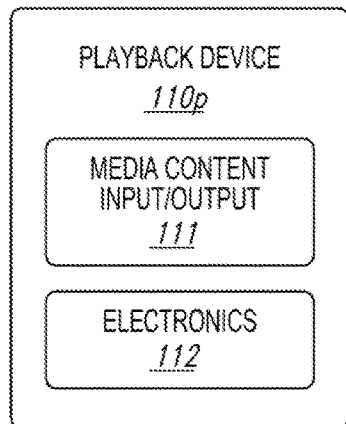
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
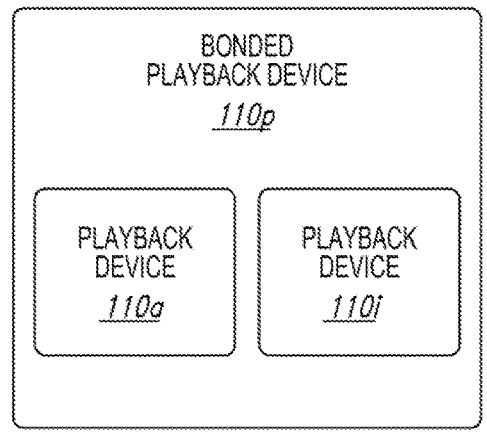
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 112a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Headphone Devices

In some embodiments a playback device may be a headphone device. Aspects of the present disclosure relate to a headphone device (e.g., WI-FI enabled headphones, WI-FI and BLUETOOTH enabled headphones, etc.) including multiple spatially diverse antennas for improved wireless performance. Further, the disclosed headphone device may be configured to operate in a variety of operational modes (e.g., WI-FI, BLUETOOTH, home theater, LTE, 5G, etc.) based on the wireless communication channel and type of media to be played by the headphone device.

Figure 2A:
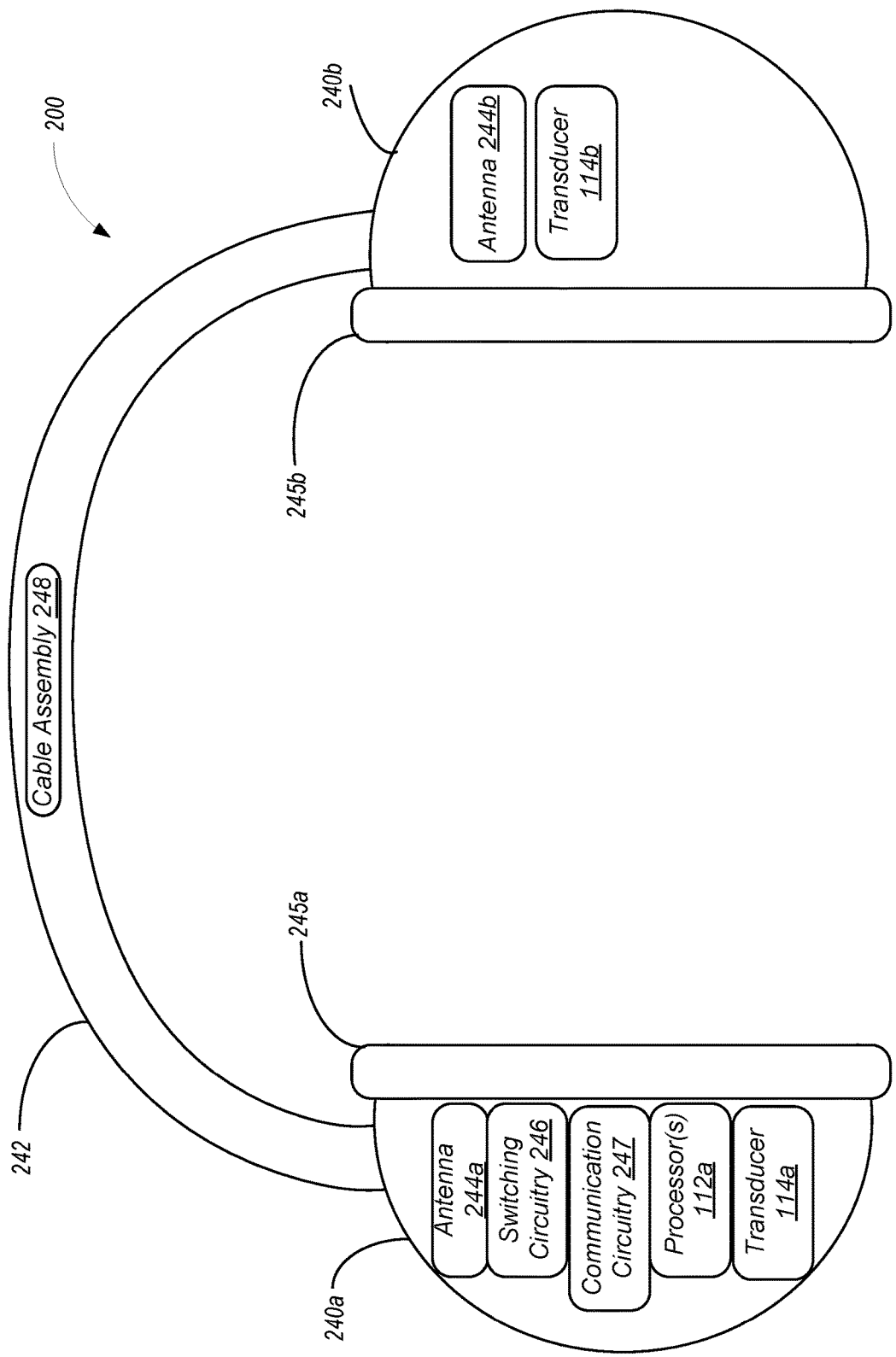
FIG. 2A is a schematic drawing of a headphone device, according to an example embodiment.

FIG. 2A shows some aspects of an example headphone device 200 according to some embodiments. The headphone device 200 may be implemented as a wearable device such as over-ear headphones, in-ear headphones, or on-ear headphones. As shown, the headphone device 200 includes a headband 242 that couples a first earpiece 240a to a second earpiece 240b. Each of the earpieces 240a and 240b may house any portion of the electronic components in the headphone device 200 (e.g., transducers 114a and 114b, amplifiers, filters, processors 212a and 212b, memory, receivers, transmitters, switches, etc.). Additionally, one or both of the earpieces 240a and 240b may house antennas 244a and 244b, switching circuitry 246, and communication circuitry 247. The switching circuitry 246 further includes a common port and is configured to selectively couple the common port to either the first antenna 244a or the second antenna 244b. Detailed example embodiments of the switching circuitry 246 and the communication circuitry 247 are provided in FIGS. 3-5. In some embodiments, the collection of above-listed components are said be enclosed within a headphone housing, which includes the combination of the first and second earpieces 240a, 240b and the headband 242.

In some example embodiments, one or more of the earpieces 240a and 240b may further include a user interface for controlling audio playback, volume level, and other functions. The user interface may include any of a variety of control elements such as a button, a capacitive touch surface, and/or a switch.

As shown in FIG. 2A, the headphone device 200 may further include ear cushions 245a and 245b that are coupled to earpieces 240a and 240b, respectively. The ear cushions 245a and 245b may provide a soft barrier between the head of a user and the earpieces 240a and 240b, respectively, to improve user comfort and/or provide acoustic isolation from the surrounding environment (e.g., passive noise reduction (PNR)).

In some embodiments, the communication circuitry 247 may comprise any of a variety of electronic components that enable transmission and/or receipt of wireless signals via antennas 244a and 244b. Examples of such components include receivers, transmitters, processors 112a, memory, amplifiers, switches, and/or filters. In some embodiments, the communication circuitry 247 may employ diversity combining techniques to intelligently combine and/or switch between the signals received from the antennas 244a and 244b. Such diversity combining/switching techniques may advantageously improve the quality of the received signal provided to the receiver to reduce the likelihood of dropouts. Dropouts occur when the headphone device 200 momentarily stops playing audio because the headphone device 200 has failed to receive data packets (or frames) comprising audio information for playback, typically because of poor RF signal strength and/or RF interference. These dropouts are usually only temporary, lasting from a few milliseconds or even up to a few seconds, but they are very disruptive to the user's listening experience. Examples of such combining/switching techniques to avoid dropouts include equal-gain combining (e.g., received signals are summed), maximum-ratio combining (e.g., received signals are weighted based on signal strength and then summed), switched combining (e.g., received signals from one antenna are used until the signal strength drops below a threshold), and selection combining (e.g., the received signal(s) with the highest signal strength are used).

In some embodiments, the antennas 244a and 244b are multi-band antennas configured to operate on several frequency bands (e.g., the 2.4 GHz band and the 5 GHz band), such as a dual-band inverted-F antenna (IFA). Further, in some examples, one or more of the antennas 244a and 244b may be passive multi-band antennas. In other examples, one or more of the antennas 244a and 244b may be active multi-band antennas. Still yet further, one of antennas 244a and 244b may be an active multi-band antenna while the other antenna may be a passive multi-band antenna. In other embodiments, one or more of antennas 244a and 244b may be single-band antennas configured to operate on a single frequency band (e.g., the 2.4 GHz band and the 5 GHz band)

It should be appreciated that the headphone device 200 may employ any number of antennas and is not limited to implementations with only two antennas. For example, the headphone device 200 may comprise two antennas for communication over WI-FI and a third antenna for communication over BLUETOOTH. Additionally (or alternatively), the headphone device 200 may comprise an additional antenna to enable near-field communication (NFC).

In some embodiments, the antennas 244a and 244b are physically separated from each other (i.e., spatially diverse). This is desirable while a user/wearer is wearing the headphone device 200, as a human head may attenuate and/or reflect electromagnetic waves causing RF signal interruption. Using a combination of antennas 244a and 244b in each earpiece 240a and 240b (i.e., on either side of the user's head when in use)—alone or in combination with one or more of the above-described switching/combining techniques—reduces RF signal interruption caused by movement and/or position of the user's head while wearing the headphones. The communication circuitry 247 and/or switching circuitry 246 allow for combining and/or switching between the antennas 244a and 244b during operation based on, for example, which antenna 244a or 244b receives a stronger signal at a given time.

By way of example, a user may be listening to the headphone device 200 over a WI-FI connection in a house via a wireless router and/or wireless modem (sometimes referred to herein generally as wireless access point). In this example, the user may initially be in a position where the first antenna 244a receives a stronger WI-FI source signal from the wireless access point than the second antenna 244b. While walking around the house wearing the headphones, the strength of signal in each of the antennas 244a and 244b will vary greatly based on, for example: (1) the user's location with respect to the wireless access point, (2) positioning of the user's head relative to the wireless access point, and/or (3) other items and/or structures in the location that tend to absorb and/or reflect RF signals. In some embodiments, the communication circuitry 247 may be configured to (i) select the antenna 244a or 244b receiving a wireless signal and (ii) control the switching circuitry 246 to couple the selected antenna to the communication circuitry 247.

In some embodiments, the headphone device 200 is configured to operate in various modes based on the particular type of wireless network employed to communicate with the external devices, such as control device 130. Example wireless networks include: a WI-FI network, a Bluetooth network, an LTE network, a 5G network, a Z-Wave network, and a ZigBee network. In one example, a first operation mode may be a WI-FI operation mode where the headphone device 200 wirelessly communicates with an external device, such as control device 130 (or any other network device such as a wireless access point, a playback device, an NMD, etc.) over a 2.4 Gigahertz (GHz) WI-FI communication link or a 5 GHz WI-FI communication link. In this example, the second operation mode may be a BLUETOOTH operation mode where the headphone device 200 wirelessly communicates with the control device 130 (or any other network device such as a wireless access point, a playback device, an NMD, etc.) over a BLUETOOTH communication link. In these embodiments, both antennas 244a and 244b are configured to receive both BLUETOOTH and WI-FI signals.

In some embodiments, the user may select a mode of operation by way of a control device 130, such as a smartphone (or tablet, computer, or other suitable computing device configured to communicate with the headphone device 200 and run a user-interface program for configuring and controlling the headphone device 200), transmitting data to the communication circuitry 247. Additionally or alternatively, the user may select a mode of operation, for example, by way of the user interface on one of the earpieces 240a or 240b. In these examples, the processor 112a may transmit messages to the communication circuitry 247. The communication circuitry 247 is configured to identify a current mode of operation from a plurality of modes of operation, e.g., any of the modes of operation disclosed and/or described herein (e.g., WI-FI mode, BLUETOOTH mode, Zigbee mode, LTE mode and so on). The communication circuitry 247 is further configured to cause the headphone device 200 to wirelessly communicate with at least one external device, such as a control device 130 or other network device, based at least in part on the current mode of operation. The control device 130 may be, for example, a smartphone, tablet, computer, etc.

Each operating mode may have an associated set of operational requirements to account for the various uses and capabilities of different wireless communication links. By way of example, a WI-FI network may be configured throughout an entire house by way of a wireless access point. As described above, a user may be walking around the house while listening to music on the headphone device 200. As the user travels throughout the home, the WI-FI signal strength at each antenna 244a and 244b may vary greatly and frequently based on the location and positioning of the user with respect to the wireless access point.

Alternatively, the user may be listening to music via the headphone device 200 over a BLUETOOTH communication link, which typically has a shorter range than a WI-FI channel. Although BLUETOOTH has a shorter range than WI-FI, users may be closer in proximity to the source of the BLUETOOTH signal (i.e., the external or control device), and the source of the BLUETOOTH signal may be positioned more consistently with respect to the headphone device 200 (e.g., more consistent relative to a WI-FI use case where a user may walk around with respect to the access point). For example, the user may be playing music on the headphone device 200 over a BLUETOOTH channel from a control device 130, such as a smartphone. In some example scenarios, the user may be walking around with the smartphone on the user's person (e.g., in the user's pocket or bag). In another example, the user may be sitting at a desk wearing the headphone device 200 with the smartphone on the desk. In both examples, the positioning of the antennas 244a and 244b remain relatively constant with respect to the control device 130. Many other example use cases and operating modes are possible, too.

To account for the varying anticipated use cases between operational modes, each mode of operation may have an associated antenna switching policy. An antenna switching policy involves determining when the switching circuitry 246 should selectively couple the common port of the switching circuitry 246 to either the first antenna 244a or the second antenna 244b. The antenna switching policy may comprise, for example, a set of criteria that govern when (if any) transitions should occur between communicating over the first antenna 244a and communicating over the second antenna 244b. The antenna switching policy may be based on various measured performance parameters, such as signal strength received at each antenna 244a and 244b, a signal to noise ratio (SNR), packet loss, or other suitable communications metric. More specifically, for each operational mode, the headphone device 200 may employ one or more predetermined performance parameter thresholds (e.g., signal strength must exceed a predetermined value (or exceed the value for some period of time), SNR must be above a threshold value (or exceed the value for some period of time), packet loss must be below a certain packet loss rate, or other suitable metric) to make decisions regarding which antenna from a set of antennas to employ for wireless communication. For example, these predetermined performance parameters thresholds may be employed by the headphone device 200 to decide whether to either continue communicating over a given antenna or switch to communicating over another antenna.

In some example embodiments, where one or both of the positioning of the headphone device 200 with respect to the signal source and/or the signal strength are expected to have less variation during use (e.g., a BLUETOOTH mode of operation as described above), the communication circuitry 247 may initially cause the common port of switching circuitry 246 to selectively couple to the antenna 244a or 244b that initially has the stronger performance parameters (e.g., greater signal strength or SNR) when the headphone device 200 first enters an operational mode. Once the common port is selectively coupled to the selected antenna 244a or 244b, the antenna switching policy for the operational mode may provide that the common port remains coupled to the selected antenna 244a or 244b for the duration of operation in that operational mode. In some examples, the communication circuitry 247 (e.g., a wireless transceiver in the communication circuitry) measures performance parameters of both antennas 244a and 244b nearly simultaneously (e.g., measure performance parameters on a first antenna, briefly switch to the second antenna to measure performance parameters, and then switch back to the first antenna and measure performance parameters). In different examples, the communication circuitry 247 measures performance parameters periodically (or at least quasi-periodically over a duration of time (e.g., measuring performance parameters every 50-100 ms, every 250-500 ms, every second, every few seconds, or other suitable duration)).

Additionally or alternatively, in some example embodiments, where one or both of the positioning of the headphone device 200 with respect to the signal source and/or the signal strength are expected to vary frequently during use (e.g., a WI-FI mode of operation as described above), the antenna switching policy may involve switching between the two antennas 244a and 244b based on the measured performance parameters and operating ranges while the headphone device 200 is in the mode of operation.

By way of example, while operating in a first operational mode (e.g., WI-FI operational mode), the communication circuitry 247 may initially cause the common port of the switching circuitry 246 to selectively couple to the first antenna 244a because the first antenna 244a had stronger measured performance parameters (e.g., greater received signal strength or (SNR) at a first time or during a first duration of time). At later time, the processor 112a may again measure the performance parameters at the first antenna 244a. If the performance parameters of the first antenna 244a are acceptable (i.e., within the predetermined operating range), the common port will remain coupled to the first antenna 244. Alternatively, if at the later time, the measured performance parameters of the first antenna 244a are outside of the predetermined operating range over a duration of time (e.g., 50-100 ms, 250-500 ms, a second, a few seconds, or other suitable duration), the switching circuitry 246 may cause the common port to couple to the second antenna 244b.

In a similar example, after selecting an initial antenna (e.g., 244a), the processor 112a may again measure and compare performance parameters at both of the antennas 244a and 244b at a later time. The switching circuitry 246 may cause the common port to couple to the other antenna (e.g., 244b) when the other antenna has better measured performance parameters. For example, in operation, the headphone device 200 determines, at a plurality of measurement points, which of the two antennas can provide a better RF signal for the headphone device 200 based on one or more performance metrics, e.g., signal strength, SNR, and/or packet loss. And based on the performance metrics determined at individual measurement points, switches back-and-forth between the two antennas based on which antenna has the better performance metrics at one or more individual measurement points.

In yet another example, the headphone device 200 may continually (or periodically, semi-periodically, or in an otherwise irregular but ongoing manner) measure performance parameters of one or both of the antennas 244a and 244b. In some embodiments, while the headphone device 200 is receiving the wireless signal via the first antenna 244a, the antenna switching policy may include switching from receiving the wireless signal via the first antenna 244a to receiving the wireless signal via the second antenna 244b if one or more performance parameters of the first antenna 244a are outside of a predetermined operational range for an duration of time (e.g., the SNR is too low for 100 ms, the packet loss is too high for 500 ms, or other suitable metric/duration threshold).

In some embodiments, this antenna switching process may repeat over a time interval. Different operational modes may use different time intervals for determining whether to switch between the two antennas. This is desirable as the wireless signal received headphone device 200 in some operational modes may vary more frequently than other operational modes, as described above. For example, the time interval for a BLUETOOTH operational mode may be longer than the time interval for a WI-FI operational mode because the wireless signal is typically expected to vary less over time when the headphone device 200 is receiving data via a BLUETOOTH connection, whereas the wireless signal is typically expected to vary more over time when the headphone device 200 is receiving data via a WI-FI connection.

Additionally, the headphone device 200 may be configured to switch between operational modes at any time during use. For example, at a first time, the headphone device 200 may be operating in a first operational mode (e.g., a BLUETOOTH mode) applying a first associated antenna switching policy (e.g., a BLUETOOTH antenna switching policy). At a later time, the headphone device 200 may operate in a second operational mode (e.g., a WI-FI mode) applying a second associated antenna switching policy (e.g., a WI-FI antenna switching policy). The headphone device 200 may switch operational modes based on instructions from the user by way of, for example, the control device 130 or the user interface.

Additionally or alternatively, the headphone device 200 may be configured to operate in various operational modes dependent upon media-type and/or synchronized devices (e.g., music, home theater, etc.).

For example, one mode may be a synchronized playback mode where headphone device 200 plays back audio content that is synchronized with playback of content output by another device. In one example, the synchronized playback mode includes a first headphone device playing back audio that is synchronized with a television set's playback of video corresponding to the audio that the first headphone device is playing back. In some embodiments, the audio may be home theater or surround sound audio. In another example, the synchronized playback mode includes the first headphone device playing back audio that is synchronized with a second headphone device's playback of the same audio that the first headphone device is playing. In yet another example, the synchronized playback mode includes the first playback device playing back audio that is synchronized with both (i) a television set's playback of video corresponding to the audio that the first headphone device is playing back and (ii) a second headphone device's playback of the same audio that the first headphone device is playing. Another mode may be a non-synchronized playback mode where the first headphone device plays back audio content that is not synchronized with content output by other devices (e.g., headphone device 200 playing only audio content without synchronization to other devices).

In some embodiments, the synchronized playback mode has a corresponding synchronized playback mode antenna switching policy, based at least in part on the requirements for audio and/or video synchronization. In these examples, the latency requirements for synchronization are stringent. For example, while a user is watching video content (e.g., a movie) on a television screen and listening to audio content (e.g., multi-channel surround sound content) corresponding to the video content, it is readily apparent when playback of the audio content via the headphones is not synchronized with playback of the video content via a television or other display device. Since packet retransmissions because of packet errors and/or missing packets caused by a weak wireless signal can make it difficult for the headphones to meet the stringent timing and latency requirements for synchronized playback, in some embodiments, the antenna switching policy for the synchronized playback mode(s) may involve measuring the performance parameters at each antenna 244a and 244b more frequently and (when necessary) switching between the two antennas more often than the antenna switching policy for the non-synchronized playback mode(s). In operation, the time intervals between measuring performance parameters may be significantly shorter when the headphones are operating in a synchronized playback mode (e.g., between about 10-30 ms, between about 10-20 ms, or about 10 ms).

Additionally or alternatively, operating in a synchronized playback mode, such as a home theater mode, may involve pairing the headphone device 200 with other playback devices described herein. In these examples, the headphone device 200 may, for example, be grouped in a playback zone. An example playback scheme may involve muting the other playback devices in the playback zone while the headphone device 200 is paired. For example, when the headphone device 200 is paired in a playback zone with a home theater system comprising multiple playback devices (e.g., a sound bar, a subwoofer, and a plurality of satellite speakers), the other multiple playback devices may not play back home theater audio while the headphones are paired with the playback zone and playing back the home theater audio. In operation, the other multiple playback devices may mute their playback of the home theater audio, or alternatively, a home theater controller (e.g., a soundbar, surround sound processor, or other device configured to coordinate surround sound playback of the home theater audio among the multiple playback devices) may simply not transmit or otherwise provide the home theater audio information to the multiple playback devices for playback while the headphone is paired in the playback zone and configured to playback the home theater audio. In some embodiments, the surround sound controller transmits or otherwise provides the home theater audio to the headphones and coordinates the headphone's synchronized playback of the home theater audio with the play back of the home theater audio's corresponding video by the television or other display screen.

Further, in some examples, multiple headphone devices 200 may be paired in the playback zone. In these examples, a playback scheme may involve outputting audio content only on the paired headphone devices 200 and muting the remaining playback devices in the playback zone. For example, when a first headphone device and a second headphone device are both paired in the playback zone with the home theater system comprising the multiple playback devices (e.g., the sound bar, subwoofer, and plurality of satellite speakers), the other multiple playback devices may not play back the home theater audio while the first and second headphones are paired with the playback zone and playing back the home theater audio. As described above, the other multiple playback devices may mute their playback of the home theater audio, or alternatively, the home theater controller may simply not transmit or otherwise provide the home theater audio information to the multiple playback devices for playback while the first and second headphones are paired in the playback zone and configured to playback the home theater audio. In some embodiments where multiple headphones are paired with the playback zone, the surround sound controller transmits or otherwise provides the home theater audio to the first and second headphones and coordinates the synchronized playback of the home theater audio by the first and second headphones with each other and with the play back of the home theater audio's corresponding video by the television or other display screen.

As described above, the headphone device 200 is, in some embodiments, configured to switch between receiving wireless signals via the first antenna 244a and the second antenna 244b based at least in part on wireless signal conditions and/or the headphone's configured operating mode. In the embodiment shown in FIG. 2A, the first antenna 244a and the communication circuitry 247 are in the first earpiece 240a and the second antenna 244b is in the second earpiece 240b. To connect the second antenna 244b in the second earpiece 240b with the communication circuitry 247 in the first earpiece 240a, the headband includes a cable assembly 248 that connects circuitry (including but not limited to the second antenna 244b, the second transducer 114b, and/or perhaps other circuitry (not shown)) disposed within the second earpiece 240b to circuitry (including but not limited to one or more of the switching circuitry 246, communication circuitry 247, processor 112a, and/or perhaps other circuitry (not shown)) disposed within the second earpiece 240b). The cable assembly 248 may be constructed as, for example, a set of one or more cables that couple (e.g., electrically couple) one or more components at least partially housed by the first earpiece 240a with one or more components at least partially housed by the second earpiece 240b. In the context of the antenna switching schemes disclosed and described herein, the cable assembly 248 connects the second antenna 244b in the second earpiece 240b with the switching circuitry 246 in the first earpiece 240a so that the switching circuitry 246 can selectively connect one of the first antenna 244a or the second antenna 244b to the communication circuitry 247 according to any of the antenna switching protocols disclosed herein.

The cable assembly 248 may be constructed as, for example, a set of one or more cables (e.g., a set of one or more flexible cables). In some examples, the cable assembly 248 comprises a coaxial cable that couples the second antenna 244b to the switching circuitry 246. In such embodiments, the coaxial cable may comprise any combination of the following: (1) one or more inner conductors; (2) one or more insulators at least partially disposed around the one or more inner conductors; (3) one or more metallic shields at least partially disposed around the one or more insulators; and (4) a jacket at least partially disposed around the one or more metallic shields. Although coaxial cables are advantageous because of durability, low noise, and ease of manufacture and implementation for the example headphone configuration(s) described herein, the cable assembly 248 may comprise other types of cables in place of the coaxial cable or in combination with the coaxial cable. For example, in some embodiments, the cable assembly 248 may comprise a triaxial cable, a flex cable, a ribbon cable, or any other cable configuration suitable for connecting circuitry in the second earpiece 240b with circuitry in the first earpiece 240a.

In some example embodiments, the headphone device 200 may transmit signals (e.g., control signals or digital or analog audio signals) over the coaxial cable in the cable assembly 248 from the first earpiece 240a to the second earpiece 240b at a lower frequency than the wireless signals so as not to interfere with the wireless signals carried by the coaxial cable. This is desirable to reduce the number of conductors required to be integrated into the cable assembly 248. For example, in operation, the coaxial cable may communicatively couple both (i) wireless signals at 2.4 GHz (BLUETOOTH or 2.4 GHz WI-FI) and/or 5.0 GHz (e.g., 5.0 GHz WI-FI) received via the second antenna 244b to the switching circuitry 246 and (ii) digital and/or analog control signals and/or audio signals at a frequency lower than the 2.4 GHz BLUETOOTH or 2.4 GHz WI-FI bands from the circuitry in the first earpiece 240a to the circuitry in the second earpiece 240b.

In some embodiments, the cable assembly 248 may comprise a plurality of conductors including, for example, any combination of the following conductors: (1) one or more conductors for power transfer; (2) one or more conductors for an I2C communication bus; (3) one or more conductors for general-purpose I/O; (4) one or more conductors for detected wireless signals (e.g., detected via an antenna such as antennas 244a and 244b); (5) one or more conductors for audio (e.g., to drive one or more transducers in, for example, earpiece 240a or 240b); and (6) one or more conductors for microphones (e.g., analog microphones and/or digital microphones).

In some embodiments, the cable assembly 248 may comprise additional conductors (e.g., spare conductors) that may be employed in the event one or more other conductors fail. For example, the headphone device 200 may monitor the status of a first set of conductors (e.g., a pair of two conductors that are employed to drive a transducer) in the cable assembly 248. If the headphone device 200 determines that the first set of conductors are operating normally (e.g., the impedance of the conductors is within a normal operating range), the headphone device 200 may continue to use the first set of conductors in the cable assembly 248. If the headphones determine that the first set of conductors are not operating normally (e.g., the impedance of the conductors is outside the normal operation range because of a conductor failing), the headphone device 200 may switch from using the first set of conductors to the spare set of conductors to enable the headphone device 200 to continue operating normally without the consumer having to return the headphone device 200 for repair.

Further, the cable assembly 248 may, for example, have dimensions that are sufficiently small so as to be integrated into the headband 242 of the headphone device 200. For example, the cable assembly 248 may have an outer diameter that is between 2.5 millimeters (mm) and 4.5 mm and/or a length between 400 mm and 600 mm. To minimize the outer diameter of the cable assembly 248, each of the conductors may, in some embodiments, be sized for the particular function of the conductor. For example, the conductors employed to drive a transducer may be larger than the conductors employed for a communication bus (e.g., an I2C bus). Particular example implementations of the cable assembly 248 are described below with reference to FIGS. 6A and 6B.

In some example embodiments, the headphone device 200 may further include one or microphones, such as microphones 115 (FIG. 1F). The microphones 115 may be disposed within one or both earpieces 240a and 240b. Further, when equipped with the microphones 115, headphone device 200 can operate as an NMD configured to receive voice input from a user and correspondingly perform one or more operations based on the received voice input. Additionally or alternatively, the microphones 115 may be used for active noise cancellation (ANC) and/or active noise reduction (ANR).

In some embodiments, one or both of the earpieces 240a may be rotatable with respect to the headband 242 to provide a more comfortable fit for the user/wearer. More specifically, the earpieces 240a and 240b may pivot with respect to the headband 242. For example, the headband may connect to the earpieces 240a and 240b by way of a rotatable hinge or other suitable connecting mechanism capable of facilitating rotation or other movement of the earpieces relative to the headband 242 to provide a comfortable fit for the wearer. In another example, the headband 242 may connect to the earpieces 240a and 240b by way of two rotatable hinges near the outer edges of the earpieces 240a and 240b.

Figure 2B:
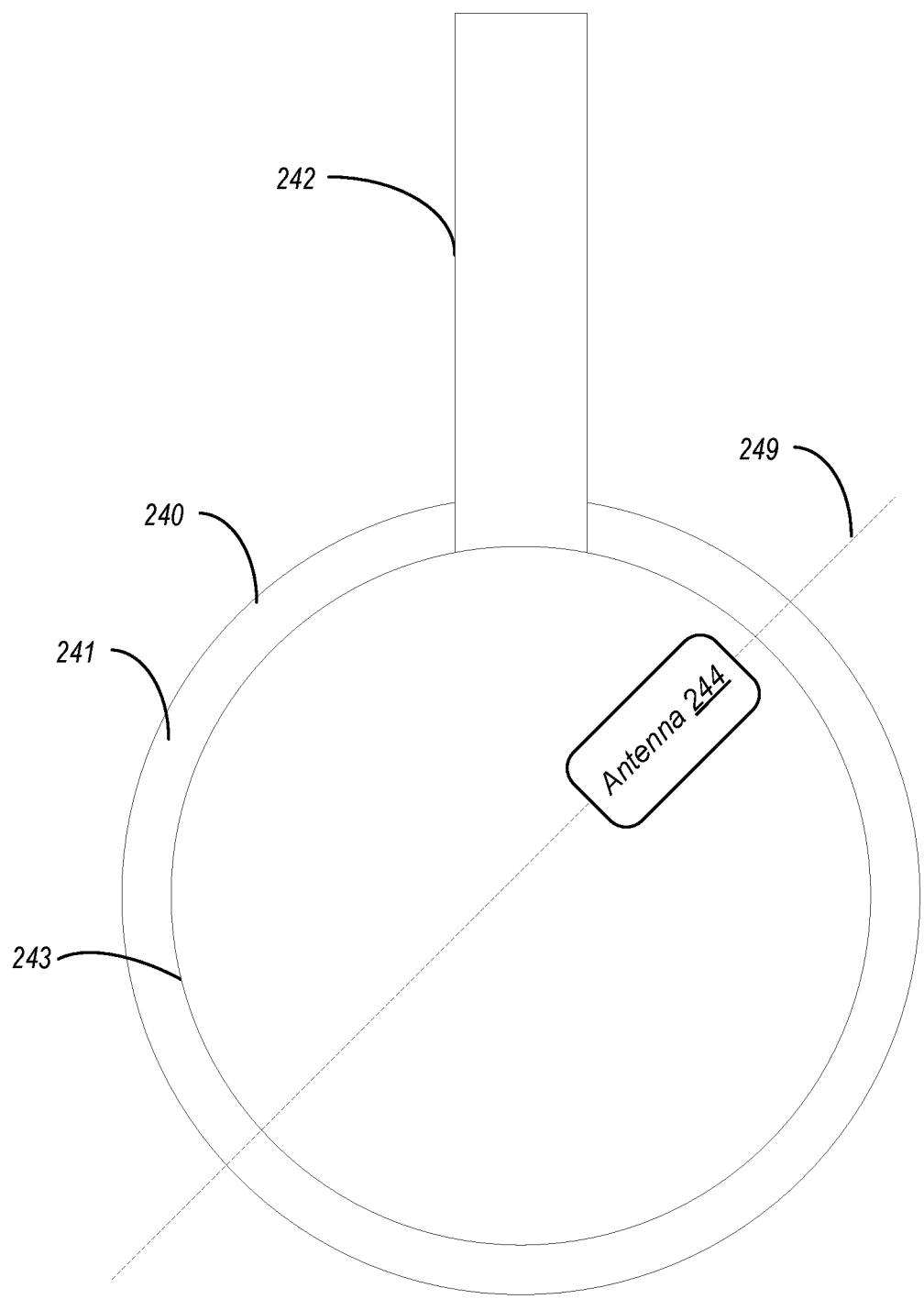
FIG. 2B is a schematic drawing of a headphone device, according to an example embodiment.

Referring to FIG. 2B, in some embodiments the earpieces 240a and 240b may include a first member 243 attached to the headband 242 and a second member 241 that pivots about the axis 249 relative to the first member 243. In these examples, the ear cushions 245a and 245b may be disposed, for example, on the second member 241, closer to the user/wearer's head. Any of the circuitry and electrical components described herein may be disposed in either the first member 243 or the second member 241. For example, the antennas 244a and/or 244b may be disposed in the first member 243.

In operation, movement and/or rotation of the antennas 244a and 244b caused by movement and/or rotation of the earpieces may negatively impact the performance of the antennas 244a and 244b. For example, antennas 244a and 244b may be tuned for operation at a particular location (e.g., with respect to the average user's head). As the antennas 244a and 244b move to different locations (e.g., with respect to the user's head) due to user adjustment of the earpieces for different head-sizes (and/or different comfort levels and/or use-cases), the antennas 244a and 244b may effectively become detuned and provide inferior performance (e.g., undesirably increase the amount of power the antennas reflect back at the transmitter during wireless transmission). To minimize movement and rotation of the antennas 244a and 244b, the antennas 244a and 244b may be integrated into the earpieces so as to minimize (or substantially reduce) the movement of the antennas 244a and 244b as the earpieces move.

In some embodiments, the antennas 244a and/or 244b may be at least partially disposed along the pivot axis 249 (e.g., and at least partially housed by the first member 243) to avoid or at least reduce movement of the antennas 244a and 244b as, for example, the first member 243 rotates with respect to the second member 241. For example, any portion of the antennas 244a and/or 244b (including any connection points between the antennas 244a and/or 244b and other elements) may be disposed along the pivot axis 249. Example connection points for the antennas 244a and/or 244b and other elements include: (1) the connection point between the antenna and a ground plane; and (2) the connection point between the antenna and a feed line. In some examples, a portion of the antennas 244a and/or 244b (including any connection points between the antennas 244a and/or 244b and other elements) may be directly disposed along the pivot axis 249. In other examples, a portion of the antennas 244a and/or 244b (including any connection points between the antennas 244a and/or 244b and other elements) may be disposed within a limited range of the pivot axis 249 (e.g., within 30 millimeters, 25 millimeters, 20 millimeters, 15 millimeters, within 10 millimeters, within 5 millimeters, within 2 millimeters, within 1 millimeter, etc.).

Further, in some embodiments, the antennas 244a and 244b employ a metal accent on the exterior of each earpiece 240a and 240b as a ground plane for the antennas 244a and 244b. The ground plane may, for example, be a conductor that is large relative to the wavelength of the transmitted electromagnetic waves for performing the grounding function. It should be appreciated that other pieces of metal within the earpieces 240a and/or 240b may also be employed as a ground plane for the antennas 244a and/or 244b. For example, the earpieces 240a and/or 240b may house a metal heatsink to cool one or more electronic components. In this example, the heatsink may be employed as a ground plane for one or more of antennas 244a and 244b.

It should be appreciated that the antennas 244a and/or 244b may be disposed in portions of the housing other than the earpieces 240a and 240b. In some embodiments, one or more of the antennas 244a and/or 244b may be at least partially disposed in the headband 242. For example, antenna 244a may be disposed in a first side of the headband 242 (e.g., proximate the left earpiece) and the antenna 244b may be disposed in a second side of the headband 242 that is opposite the first side (e.g., proximate the right earpiece).

IV. Example Communication Systems

Figure 3:
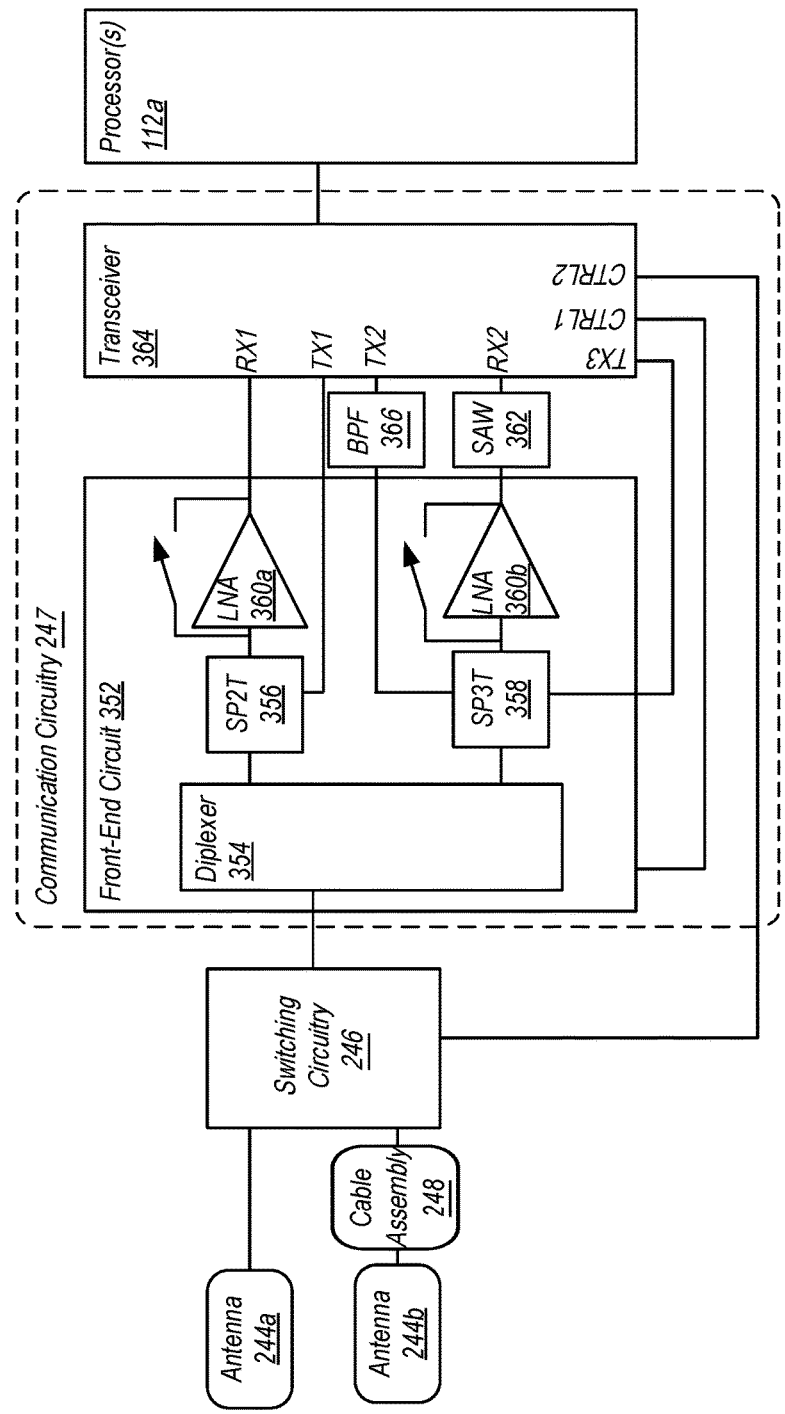
FIG. 3 is a block diagram of a circuitry within a headphone device, according to an example embodiment.
Figure 4A:
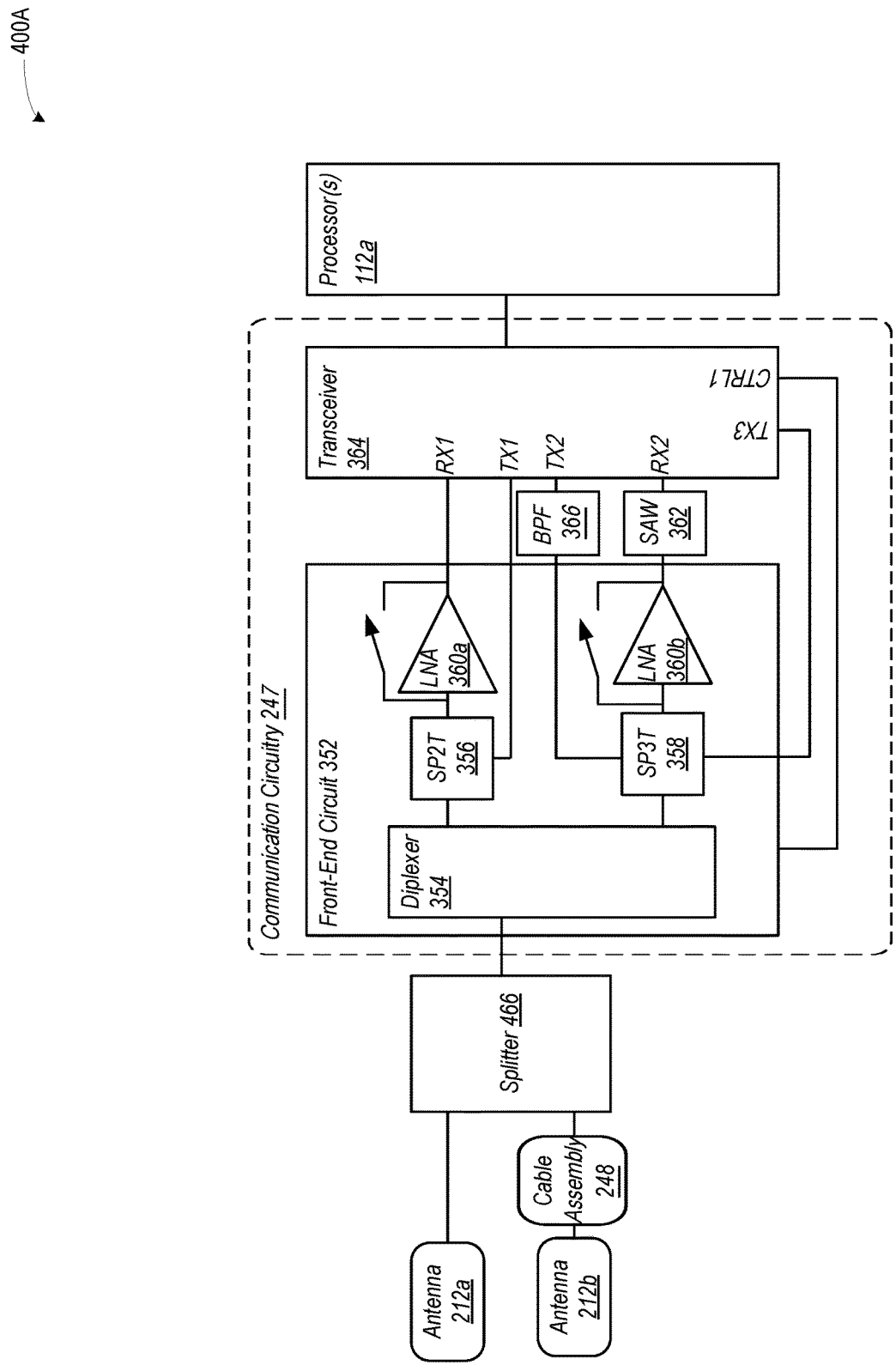
FIG. 4A is a block diagram of a circuitry within a headphone device, according to an example embodiment.
Figure 4B:
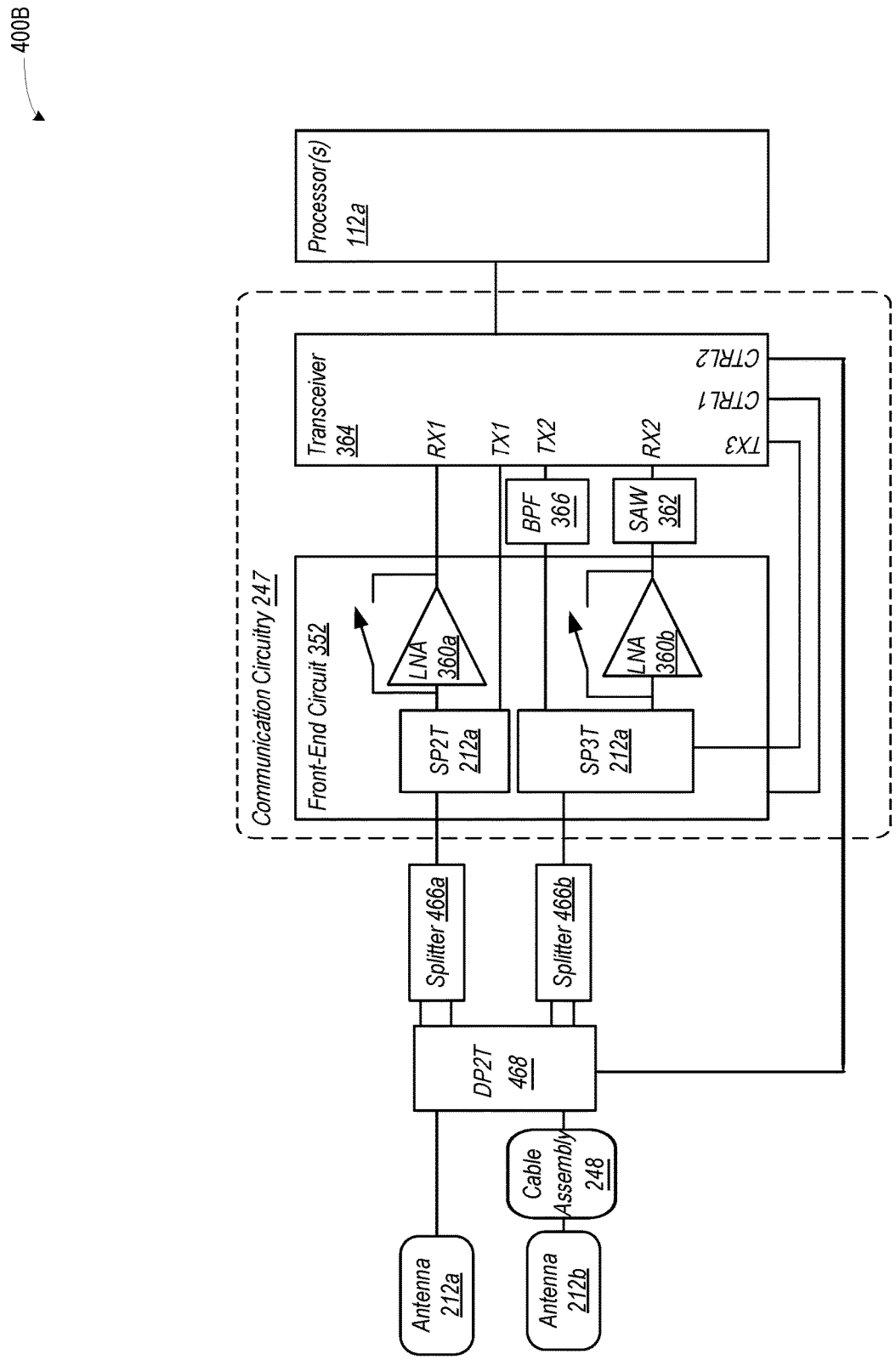
FIG. 4B is a block diagram of a circuitry within a headphone device, according to an example embodiment.
Figure 5:
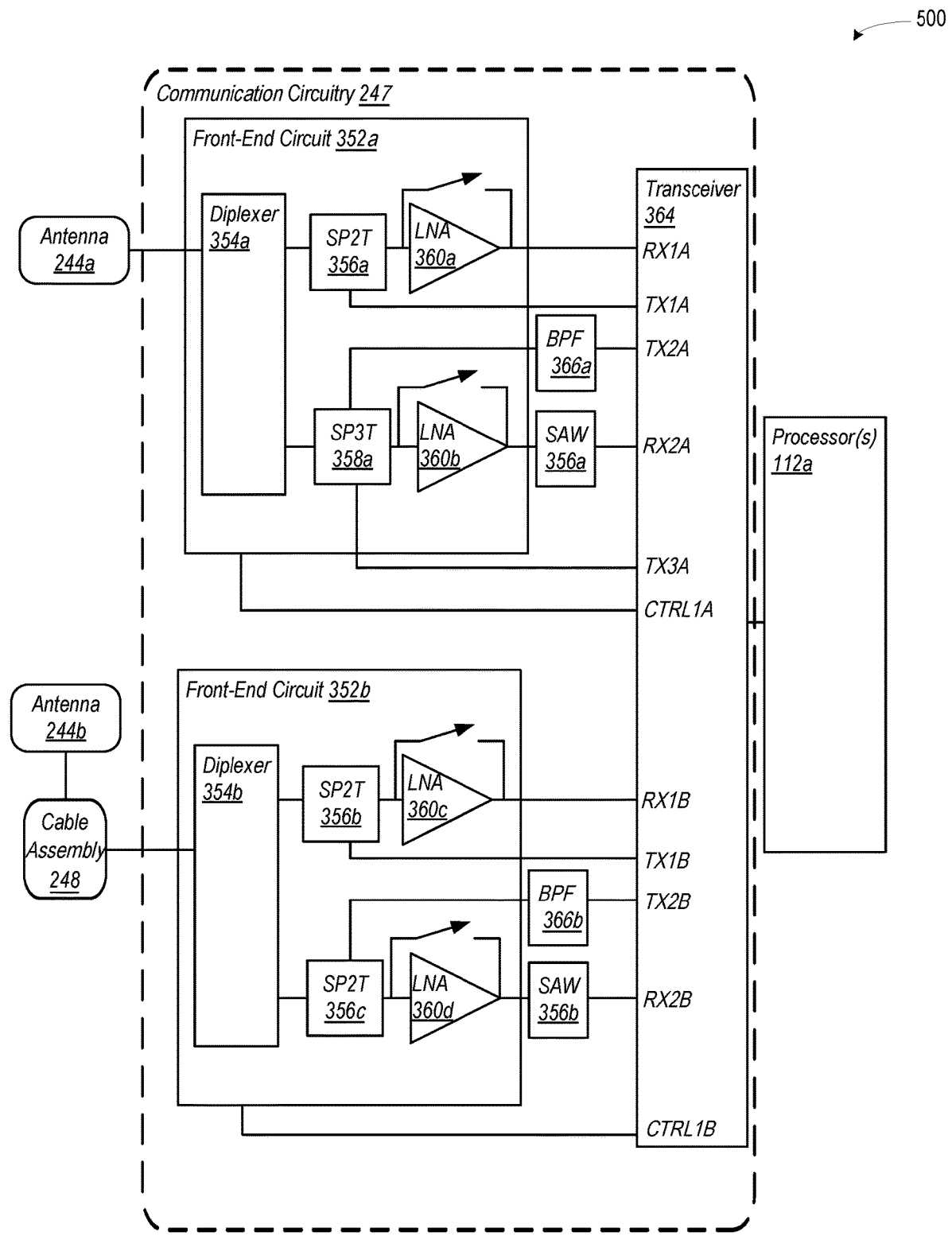
FIG. 5 is a block diagram of a circuitry within a headphone device, according to an example embodiment.

FIGS. 3-5, show example communication systems (shown as communication systems 300, 400A, 400B, and 500 in FIGS. 3, 4A, 4B, and 5, respectively) that include example switching circuitry 246 and/or communication circuitry 247 configurations. The communication systems 300, 400A, 400B, and 500 may be implemented in, for example, any of a variety of network devices including, for example, the headphone device 200.

Referring to FIG. 3, in some embodiments, the communication circuitry 247 is coupled to a common port of the switching circuitry 246 and comprises a front-end circuit 352, a surface acoustic wave (SAW) filter 362, a transceiver 364, and a band-pass filter (BPF) 366. Optionally, in some embodiments, the SAW filter 362 and/or the BPF 366 may be included in the front-end circuit 352. Depending on where the switching circuitry 246 is housed, the switching circuitry 246 may be coupled to one or both antennas 244a and 244b by way of the cable assembly 248. For example, in the context of the headphone device 200, if the switching circuitry 246 is housed in the first earpiece 240a, the switching circuitry 246 may be coupled to the second antenna 244b by way of the cable assembly 248 housed in the headband 242. Further, in some embodiments, the transceiver 364 may be coupled to the one or more processors 112a. The transceiver 364 may be configured for operation in multiple modes (e.g., a 2.4 GHz WI-FI operation mode, a 5.0 GHz WI-FI operation mode, and/or a BLUETOOTH operation mode).

In some embodiments, the switching circuitry 246 may be configured to selectively couple one of antennas 244a and 244b to the communication circuitry 247 based on a received control signal. The switching circuitry 246 may be implemented using, for example, one or more switches such as a single-pole, double throw switch (SP2T) switch. In some examples, the control signal may be generated by, for example, the transceiver 364 (e.g., provided via a second control port (CTRL2)). In these examples, the transceiver 364 may comprise one or more network processors that execute instructions stored in a memory (e.g., a memory within the transceiver 364 such as an internal read-only memory (ROM) or an internal read-write memory) that causes the transceiver 364 to perform various operations. An antenna switching program (e.g., that controls the switching circuitry 246 in accordance with the methods described herein) may be stored in the memory and executed by the one or more network processors to cause the transceiver 364 to generate and provide control signals to the switching circuitry 246. In other examples, the control signal for the switching circuitry 246 may be generated by the processor 112a instead of the transceiver 364.

In some embodiments, the front-end circuit 352 may further include a diplexer 354 comprising (i) a first port coupled to a SP2T switch 356, (ii) a second port coupled to a single pole, triple throw (SP3T) switch 358, and (iii) a third port coupled to the switching circuitry 246. The diplexer 354 is configured to separate multiple channels, for example, using one or more filters. More specifically, the diplexer 354 receives a wide-band input from one or more of the antennas 244a and 244b (e.g., via the switching circuitry 246) and provides multiple narrow-band outputs. For example, the diplexer 354 may provide a first narrow-band output for a 5 GHz frequency band at the first port to SP2T switch 356 and provide a second narrow-band output for a 2.4 GHz frequency band at the second port to SP3T switch 358.

In some embodiments, SP2T switch 356 comprises a first port coupled to a low noise amplifier (LNA) 360a, a second port coupled to a first transmit port (TX1) of the transceiver 364 (e.g., a 5.0 GHz WI-FI transmit port), and a common port coupled to the diplexer 354. The SP2T switch 356 is configured to selectively couple the common port of the SP2T switch 356 to either the first port or the second port of the SP2T switch 356 based on a received control signal. The control signal may be provided by, for example, the transceiver 364 (e.g., via a first control port (CTRL1) of the transceiver 364).

In some embodiments, SP3T switch 358 comprises a first port coupled to LNA 360b, a second port coupled to a second transmit port (TX2) of the transceiver 364 (e.g., a 2.4 GHz WI-FI transmit port), a third port coupled to a third transmit port (TX3) of the transceiver 364 (e.g., a BLUETOOTH transmit port), and a common port coupled to the diplexer 354. The SP3T switch 358 is configured to selectively couple the common port of the SP3T switch 358 to either the first port, the second port, or the third port of the SP3T switch 358 based on a received control signal. The control signal may be provided by, for example, the transceiver 364 (e.g., via the first control port (CTRL1) of the transceiver 364).

In some embodiments, each of the LNAs 360a and 360b are further coupled to a first receive port (RX1) (e.g., a 5.0 GHz WI-FI receive port) and a second receive port (RX2) (e.g., a 2.4 GHz WI-FI and/or BLUETOOTH receive port), respectively, of the transceiver 364. In operation, the LNAs 360a and 360b amplify the wireless signals detected by the antennas prior to being received by the transceiver 364 (which may contain additional amplifiers such as additional LNAs) to improve receive sensitivity of the communication system 300. A bypass-switch may be coupled in parallel with each of the LNAs 360a and 360b that may be controlled by the transceiver 364 (e.g., via the first control port CTRL1 of the transceiver 364). In operation, the bypass-switch allows the transceiver 364 (or other control circuitry) to close the bypass-switch when the signal received at the transceiver 364 is above a threshold to avoid saturation of one or more amplifiers in the transceiver 364. Thus, the bypass-switch may be open when the signal received at the transceiver 364 has an amplitude below a threshold to improve receive sensitivity and closed when the signal received at the transceiver 364 has an amplitude above the threshold to avoid amplifier saturation.

The SAW filter 362 is desirable in some embodiments to filter out external noise from the environment. In a standard operating environment, there may be a lot of noise near and in the 2.4 GHz band including, for example, noise from cordless home phones, cell phones, etc. In operation, the SAW filter 362 is configured to remove such wireless signal interference in the operating environment. The SAW filter 362 may be designed as a BPF, a low-pass filter, and/or a high-pass filter. It should be appreciated that filters separate and apart from a SAW may be employed in place of (or in combination with) SAW filter 362. Other example types of filters include crystal filters (e.g., quartz crystal filters) and bulk acoustic wave (BAW) filters.

The BPF 366 may be desirable in some embodiments to reduce out-of-band energy in the output from the transceiver 364 (e.g., from the second transmit port TX2). For example, the output of the output of the transceiver 364 may comprise some energy that if out-of-band when outputting a wireless signal in a channel that is on the edge of the band (e.g., channel 1 or channel 11 in a 2.4 GHz Wi-Fi band). The BPF 366 may, in some implementations, be implemented as a controllable BPF. For example, the BPF 366 may comprise a BPF and one or more switches that either allow the BPF to be incorporated into the signal path between the transceiver 364 and the SP3T switch 358 or bypassed. In this example, the transceiver 364 may provide a control signal to the controllable BPF to either have the BPF be included in the signal path or bypassed.

In some embodiments, the switching circuitry 246 (and the associated antenna switching techniques) may be replaced by a splitter as shown by communication system 400A in FIG. 4A. Relative to communication system 300 in FIG. 3, the switching circuitry 246 is replaced by a splitter 466 in communication system 400A. The splitter 466 may be configured to both non-coherently combine the outputs from the antennas 244a and 244b and split a signal received from the diplexer 354 to provide an output to both antenna 244a and 244b. The splitter 466 may be implemented as, for example, a wide-band splitter configured to combine and split signals within a range of frequencies that includes at least two frequency bands (e.g., a 2.4 GHz frequency band and a 5 GHz frequency band). As a result, the two antennas 244a and 244b may be seen by the transceiver 364 as a single antenna with a larger radiation pattern that combines the radiation patterns of each of antennas 244a and 244b.

Further, employing an RF splitter 466, rather than the switch 350, may provide various benefits relative to other approaches. For example, the latency of the communication system 400A may be reduced relative to other approaches, which may be desirable while operating, for example, in the synchronized playback mode(s). The latency reduction may result from any combination of the following: (1) removing the need to compute which antenna 244a or 244b to switch to and the associated switching time; and (2) fewer lost packets that would otherwise require retransmission because the scenario where a sub-optimal antenna is selected for a given moment is avoided.

In some embodiments, the splitter 466 shown in FIG. 4A may be replaced with multiple splitters as shown in FIG. 4B by communication system 400B. Relative to the communication system 400A, the communication system 400B removes the diplexer 354 and replaces the splitter 466 with a double, pole double throw (DP2T) switch 468, a first splitter 466a, and a second splitter 466b. DP2T switch 468 may be configured to selectively couple both antennas 212a and 212b to either splitter 466a or splitter 466b based on a control signal (e.g., a control signal received from a second control port (CTRL2) in transceiver 364). By incorporating additional splitters into the communication system as shown in FIG. 4B, a single wide-band splitter may be replaced with multiple narrow-band splitters each configured to combine and split signals in different frequency bands (e.g., non-overlapping frequency bands). For example, the splitter 466a may be a narrow-band splitter configured to combine and split signals in a 5 GHz frequency band and the splitter 466b may be a narrow-band splitter configured to combine and split signals in a 2.4 GHz frequency band.

In some embodiments, the switching circuitry 246 may be removed in favor of a 2×2 multiple-input, multiple-output (MIMO) design that enables the transceiver 364 to independently receive (and transmit) wireless signals via antennas 244a and 244b. 2×2 MIMO systems may offer various advantages over other designs such as facilitating use of processing techniques that combine (e.g., coherently combine) the output of each of antennas 244a and 244b. For example, a 2×2 MIMO system may support Maximum-Ratio Combining (MRC) where the signals from the antennas 244a and 244b may be coherently combined using a weighting factor for each signal stream (e.g., a weighting factor that is proportional to the signal amplitude).

Figure 6A:
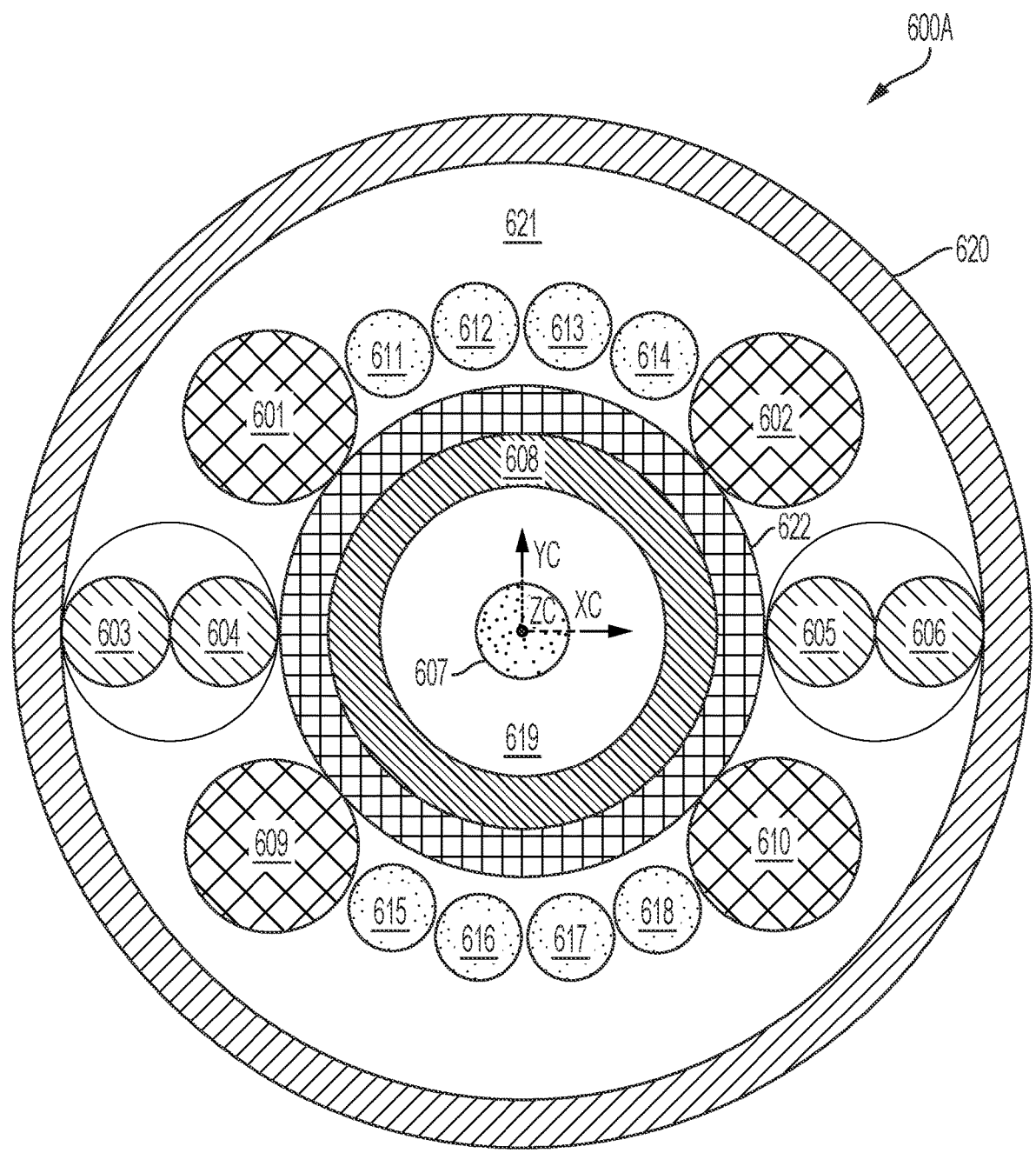
FIG. 6A is a cross-sectional diagram of an example cable assembly, according to an example embodiment.
Figure 6B:
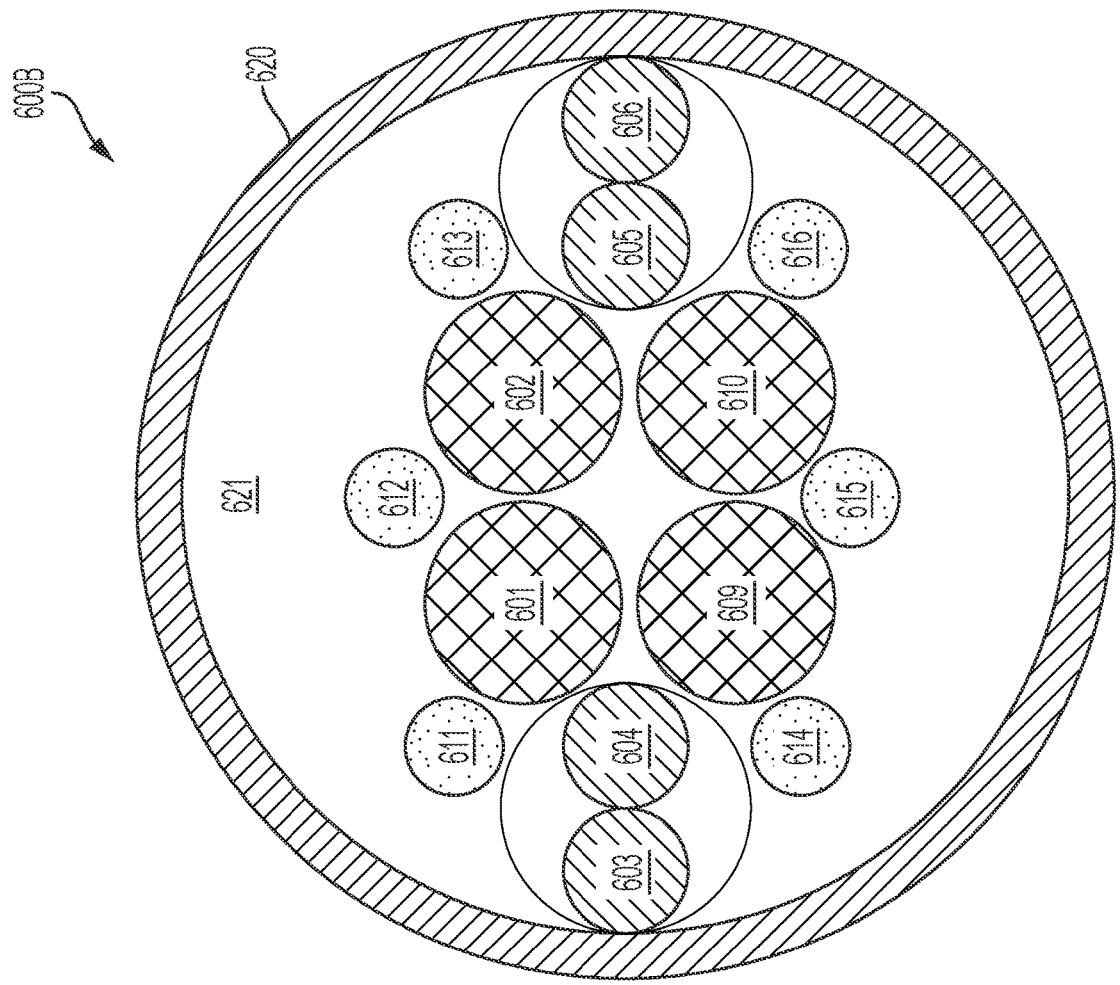
FIG. 6B is a cross-sectional diagram of another example cable assembly, according to an example embodiment.
Figure 6B:
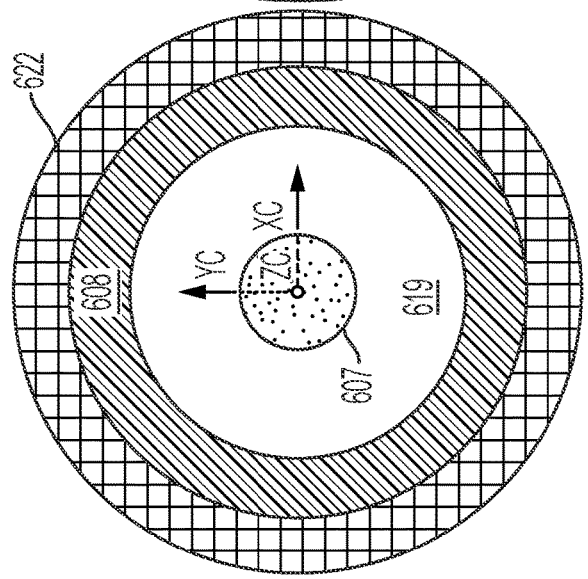

An example of such a communication system that implements a 2×2 MIMO design is shown in FIG. 6 by communication system 600. Relative to the communication system 300 shown in FIG. 3, the communication system 600 removes the switching circuitry 246 such that the front-end circuit 352 (now shown as 352a) is coupled to the antenna 244a, adds a second front-end circuit 352b coupled between the antenna 244b and the transceiver 364, adds a second SAW filter 356b (original SAW filter 356 from FIG. 3 is shown as 356a), and adds a second BPF 366b (originally BPF 366 from FIG. 3 is shown as BPF 366a).

In some embodiments, the construction of the second front-end circuit 352b may be similar to (or the same as) the construction of the first front-end circuit 352a. For example, the diplexer 354b, SP2T switch 356b, LNA 360c, and LNA 360d may be the same as diplexer 354a, SP2T switch 356a, LNA 360a, and LNA 360b, respectively. SP3T switch 358a may be replaced with SP2T switch 356c instead of another SP3T, as shown in communication system 600, in implementations where the transceiver 364 transmits a particular type of signal (e.g., BLUETOOTH signals) over a single antenna (e.g., antenna 244a) while transmitting other types of signals (e.g., 2.4 GHz and/or 5 GHz WI-FI signals) over both antennas.

It should be appreciated that one or more components may be added to and/or removed from the communication systems shown in FIGS. 3, 4A, 4B, and 5 without departing from the scope of the present disclosure. For example, the communication systems may comprise additional filters, amplifiers, switches, cables, antennas, and/or diplexers than what it is shown in FIGS. 3, 4A, 4B, and 5. Additionally (or alternatively), one or more of the filters (e.g., BPF 366, SAW 356, etc.), amplifiers (e.g., LNAs 360a, 360b, etc.), switches (e.g., bypass switch(es), SP2T 356, SP3T 358, etc.), cables (e.g., cable assembly 248 or any portion thereof), antennas (e.g., antennas 244a, 244b, etc.), and/or diplexers (e.g., diplexer 354, etc.) may be removed from the communication systems shown in FIGS. 3, 4A, 4B, and 5.

V. Example Cable Assemblies

FIGS. 6A and 6B each depict an example cross-section of a cable assembly that may be employed as cable assembly 248. The cable assemblies 600A and 600B shown in FIGS. 6A and 6B, respectively, each comprise a plurality of conductors (shown as conductors 601-618), insulation (shown as insulation 619 and 621), and cable jackets (shown as jackets 620 and 622).

As shown in FIG. 6A by cable assembly 600A, the cable assembly 248 may, in some embodiments, be implemented as a single cable bundle that comprises an inner coaxial cable formed by conductor 607, insulation 619, conductor 608, and jacket 622. The cable assembly 600A further comprises a set of conductors (shown as conductors 601-606 and 609-618) disposed between the inner coaxial cable and the cable jacket 620.

As shown in FIG. 6B by cable assembly 600B, the cable assembly 248 may, in some embodiments, be implemented using a set of multiple distinct cables. In particular, the coaxial cable formed by conductor 607, insulation 619, conductor 608, and jacket 622 may be separated from the remainder of the conductors (shown as conductors 601-606 and 609-618). As a result, the cable assembly 600B comprises multiple cables including a first cable (e.g., a coaxial cable) formed by conductor 607, insulation 619, conductor 608, and jacket 622 and a second cable formed by conductors 601-606 and 609-618, insulation 621, and jacket 620.

In some embodiments, one or more of the conductors 601-618 may be arranged in twisted pairs. For example, the conductors that support a communication bus (e.g., an I2C bus) and/or general purpose I/O may be arranged in twisted pairs. Arranging the conductors in such a fashion (e.g., as a twisted pair) may advantageously reduce electromagnetic radiation, reduce crosstalk, and improve noise rejection.

In some embodiments, one or more of the conductors 601-618 may be stranded conductors. For example, the conductors that transfer power and/or carry audio signals (e.g., originating from a microphone or being provided to a transducer) may be stranded to advantageously improve the flexibility of the cable assembly. These stranded conductors may be insulated using, for example, a thin film polymer and/or an enamel type insulation.

The structure and function of the particular conductors 601-618 shown in FIGS. 6A and 6B may vary based on the particular implementation. One example implementation of each of conductor 601-618 in FIGS. 6A and 6B is shown in Table 1 below:

TABLE 1

Example Cable Assembly Specification for Cable Assemblies shown in FIGS. 6A and 6B

| Element Number | Type | Alternate Type | Diameter/AWG | Function | Impedance |
| --- | --- | --- | --- | --- | --- |
| 601 | Single Conductor Stranded | | 0.4 mm/26 AWG | PWR+ | |
| 602 | Single Conductor Stranded | | 0.4 mm/26 AWG | PWR− | |
| 603 604 | Twisted Pair | Micro Coax | 0.25 mm/30 AWG | GPIO/INT | 50 Ohm |
| 605 606 | Twisted Pair | Micro Coax | 0.25 mm/30 AWG | I2C | 50 Ohm |
| 607 608 | Coax | | 1.13-1.37 mm | Antenna | 50 Ohm |
| 609 | Single Conductor Stranded | | 0.4 mm/26 AWG | Audio+ | |
| 610 | Single Conductor Stranded | | 0.4 mm/26 AWG | Audio− | |
| 611 | Single Conductor Stranded | | 0.2 mm/32 AWG | Digital Mic+ | |
| 612 | Single Conductor Stranded | | 0.2 mm/32 AWG | Digital Mic− | |
| 613 | Single Conductor Stranded | | 0.2 mm/32 AWG | Analog Mic+ | |
| 614 | Single Conductor Stranded | | 0.2 mm/32 AWG | Analog Mic− | |

TABLE 1-continued

Example Cable Assembly Specification for Cable Assemblies shown in FIGS. 6A and 6B

| Element Number | Type | Alternate Type | Diameter/AWG | Function | Impedance |
|---|---|---|---|---|---|
| 615 | Single Conductor Stranded | | 0.2 mm/32 AWG | Analog Mic+ | |
| 616 | Single Conductor Stranded | | 0.2 mm/32 AWG | Analog Mic− | |
| 617 | Single Conductor Stranded | | 0.2 mm/32 AWG | Spare | |
| 618 | Single Conductor Stranded | | 0.2 mm/32 AWG | Spare | |

It should be appreciated that the particular implementation of conductors 601-618 shown Table 1 above is only one example implementation and the conductors 601-618 may be constructed in other ways. For example, cable assembly may use additional conductors or fewer conductors (e.g., to accommodate a different number of components such as microphones). Further, the diameter of any portion of the conductors 601-618 may be changed (e.g., to accommodate for different impedance requirements).

VI. Example Methods

Figure 7:
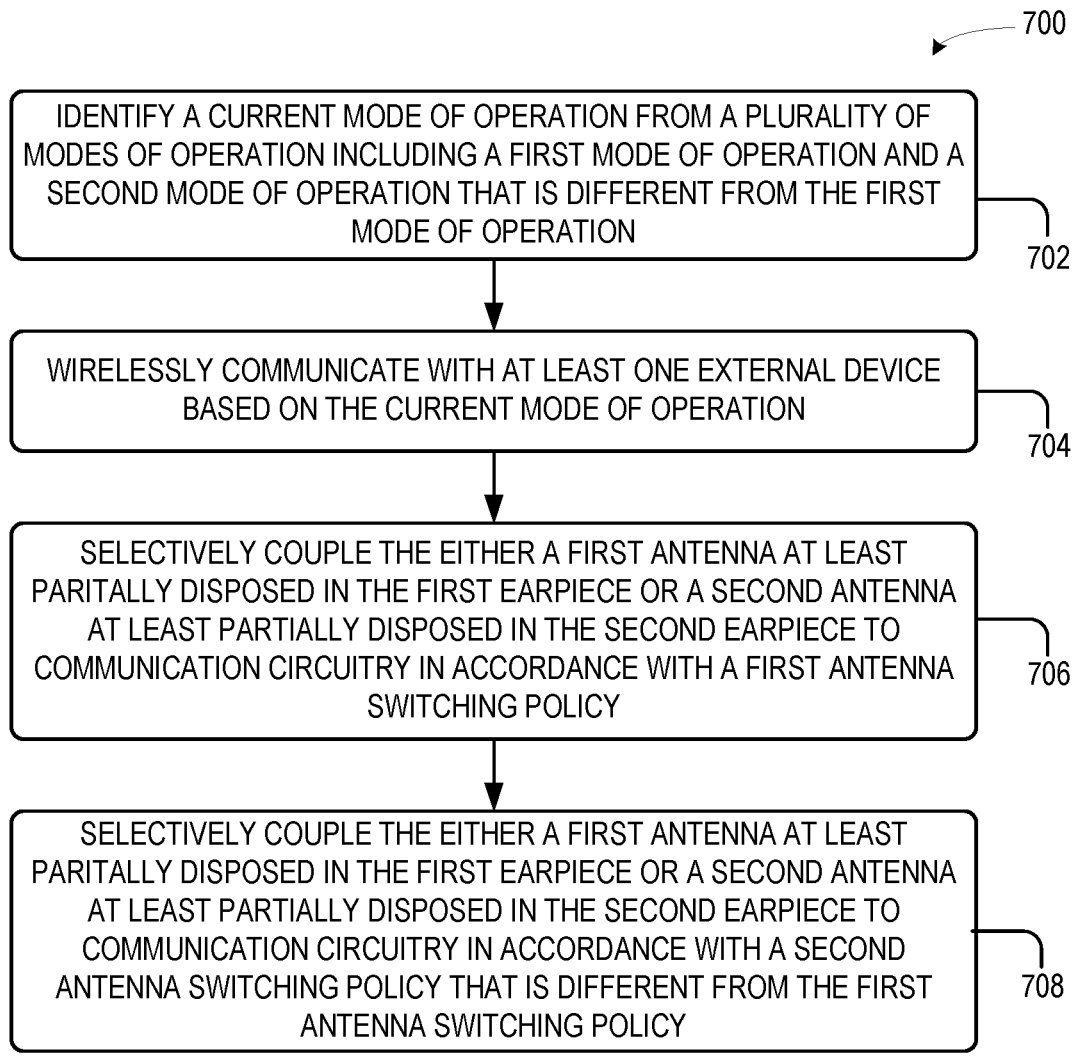
FIG. 7 is a method in accordance with an example embodiment.

As discussed above, in some examples, a headphone device is configured to operate according multiple operational modes and antenna switching policies. FIG. 7 shows an example embodiment of a method 700 for a headphone device 200 employing multiple operational modes and antenna switching techniques.

Method 700 can be implemented by any of the playback devices (e.g., headphone device 200) disclosed herein, individually or in combination with any of the computing systems (e.g., computing system(s) 106) and/or user devices (e.g., user devices 130) disclosed herein, or any other computing system(s) and/or user device(s) now known or later developed.

Method 700 begins at block 702, which includes identifying a current mode of operation from a plurality of modes of operation including a first mode of operation and a second mode of operation that is different from the first mode of operation.

For example, in some embodiments, the first mode of operation comprises one of: (i) a standalone BLUETOOTH mode of operation where the headphone is playing back audio content that is not synchronized with playback of corresponding video content; (ii) a synchronized BLUETOOTH mode of operation where the headphone is playing back audio content (e.g., home theater or surround sound audio) that is synchronized with playback of corresponding video content by a television or other display device; (iii) a synchronized BLUETOOTH mode of operation where the headphone is playing back audio content that is synchronized with playback of audio content by another headphone device; (iv) a synchronized BLUETOOTH mode operation where the headphone is playing back audio content (e.g., home theater or surround sound) that is synchronized with both (iv-a) playback of the audio content in synchrony with another headphone device and (iv-b) playback of corresponding video content by a television or other display device; (v) a standalone 2.4 GHz WI-FI mode of operation where the headphone is playing back audio content that is not synchronized with playback of corresponding video content; (vi) a synchronized 2.4 GHz WI-FI mode of operation where the headphone is playing back audio content (e.g., home theater or surround sound audio) that is synchronized with playback of corresponding video content by a television or other display device; (vii) a synchronized 2.4 GHz WI-FI mode of operation where the headphone is playing back audio content that is synchronized with playback of audio content by another headphone device; (viii) a synchronized 2.4 GHz WI-FI mode operation where the headphone is playing back audio content (e.g., home theater or surround sound) that is synchronized with both (viii-a) playback of the audio content in synchrony with another headphone device and (viii-b) playback of corresponding video content by a television or other display device; (ix) a standalone 5.0 GHz WI-FI mode of operation where the headphone is playing back audio content that is not synchronized with playback of corresponding video content; (x) a synchronized 5.0 GHz WI-FI mode of operation where the headphone is playing back audio content (e.g., home theater or surround sound audio) that is synchronized with playback of corresponding video content by a television or other display device; (xi) a synchronized 5.0 GHz WI-FI mode of operation where the headphone is playing back audio content that is synchronized with playback of audio content by another headphone device; and (xii) a synchronized 5.0 GHz WI-FI mode operation where the headphone is playing back audio content (e.g., home theater or surround sound) that is synchronized with both (xii-a) playback of the audio content in synchrony with another headphone device and (xii-b) playback of corresponding video content by a television or other display device. And in some embodiments, the second mode of operation comprises one of the above-listed modes of operation other than the first mode of operation.

At block 704, method 700 further includes wirelessly communicating with at least one external device based on the current mode of operation.

For example, in some embodiments, while in any of the above-listed BLUETOOTH modes of operation, the headphone device (e.g., communication circuitry 247) is configured to selectively connect (e.g., via controlling the switching circuitry 246) one of the first antenna 244a or the second antenna 244b to appropriate inputs of the transceiver 364 to process BLUETOOTH signals received via the first or second antenna from an external computing device (e.g., a smart phone, surround sound controller, sound bar, tablet computer or other computing device) configured to communicate with the headphone device via BLUETOOTH.

Similarly, while in any of the above-listed 2.4 GHz WI-FI modes of operation, the headphone device (e.g., communication circuitry 247) is configured to selectively connect (e.g., via controlling the switching circuitry 246) one of the first antenna 244*a* or the second antenna 244*b* to appropriate inputs of the transceiver 364 to process 2.4 GHz WI-FI signals received via the first or second antenna from an external computing device (e.g., a smart phone, surround sound controller, sound bar, tablet computer or other computing device) configured to communicate with the headphones via a 2.4 GHz WI-FI communication channel.

And, while in any of the above-listed 5.0 GHz WI-FI modes of operation, the headphone device (e.g., communication circuitry 247) is configured to selectively connect (e.g., via controlling the switching circuitry 246) one of the first antenna 244*a* or the second antenna 244*b* to appropriate inputs of the transceiver 364 to process 5.0 GHz WI-FI signals received via the first or second antenna from an external computing device (e.g., a smart phone, surround sound controller, sound bar, tablet computer or other computing device) configured to communicate with the headphones via a 5.0 GHz WI-FI communication channel.

At block 706, method 700 further includes, while the current mode of operation is the first mode of operation, selectively coupling either a first antenna at least partially disposed in the first earpiece or a second antenna at least partially disposed in the second earpiece to communication circuitry in accordance with a first antenna switching policy.

For example, in some embodiments, when the first mode of operation is one of the above-described BLUETOOTH modes of operation, selectively coupling either a first antenna at least partially disposed in the first earpiece or a second antenna at least partially disposed in the second earpiece to communication circuitry in accordance with a first antenna switching policy, a block 706 includes one or more of the following: (i) when first entering the BLUETOOTH mode of operation, determining which of the first or second antenna has better wireless performance metrics (e.g., higher signal strength, greater SNR, lower packet loss) based on an initial wireless signal assessment, (ii) selecting, from the first and second antennas, the antenna having the better wireless performance metrics, and (iii) controlling the switching circuitry 246 to connect the transceiver 364 to the selected antenna.

In some BLUETOOTH modes of operation, when the corresponding antenna switching policy includes the headphone continuing to receive BLUETOOTH signals via the initially-selected antenna during the duration of a listening session. But in some BLUETOOTH modes of operation, the corresponding antenna switching policy includes the headphone continuing to receive BLUETOOTH signals via the initially-selected antenna for some comparatively long duration of time, e.g., a few seconds to a few minutes, before performing the functions of (i) determining which of the first or second antenna has better wireless performance metrics (e.g., higher signal strength, greater SNR, lower packet loss) based on a wireless signal assessment, (ii) in response to determining that the wireless performance metrics for the currently selected antenna are better (or in some embodiments, not worse by some threshold amount, e.g., worse by 10%, 20%, or some other suitable threshold) than the wireless performance metrics of the non-selected antenna, continuing to receive BLUETOOTH wireless signals via the selected antenna, or (iii) in response to determining that the wireless performance metrics for the non-selected antenna are better (or in some embodiments, better by some threshold amount, e.g., better by 10%, 20%, or some other suitable threshold) than the wireless performance metrics of the currently-selected antenna, (iii-a) selecting the other antenna and (iii-b) controlling the switching circuitry 246 to connect the transceiver 364 to the selected other antenna. In some embodiments, the corresponding antenna switching policy includes the headphone device continuing to reassess wireless metrics for the first and second antennas in an on-going manner (e.g., every few seconds to every few minutes) and switching between receiving BLUETOOTH signals via one of the first or second antennas based on the wireless performance metrics.

In another example, in some embodiments, when the first mode of operation is one of the above-described 2.4 GHz or 5.0 GHz WI-FI modes of operation, selectively coupling either a first antenna at least partially disposed in the first earpiece or a second antenna at least partially disposed in the second earpiece to communication circuitry in accordance with a first antenna switching policy a block 706 includes one or more of the following: (i) when first entering the WI-FI mode of operation, determining which of the first or second antenna has better wireless performance metrics (e.g., higher signal strength, greater SNR, lower packet loss) based on an initial wireless signal assessment, (ii) selecting, from the first and second antennas, the antenna having the better wireless performance metrics, and (iii) controlling the switching circuitry 246 to connect the transceiver 364 to the selected antenna.

In some WI-FI modes of operation, the headphone is configured to continue receiving WI-FI signals via the initially-selected antenna during the duration of a listening session.

But in some WI-FI modes of operation, the corresponding antenna switching policy includes the headphone continuing to receive WI-FI signals via the initially-selected antenna for some comparatively short duration of time, e.g., a few milliseconds to a few seconds, before performing the functions of (i) determining which of the first or second antenna has better wireless performance metrics (e.g., higher signal strength, greater SNR, lower packet loss) based on a wireless signal assessment, (ii) in response to determining that the wireless performance metrics for the currently selected antenna are better (or in some embodiments, not worse by some threshold amount, e.g., worse by 10%, 20%, or some other suitable threshold) than the wireless performance metrics of the non-selected antenna, continuing to receive WI-FI wireless signals via the selected antenna, or (iii) in response to determining that the wireless performance metrics for the non-selected antenna are better (or in some embodiments, better by some threshold amount, e.g., better by 10%, 20%, or some other suitable threshold) than the wireless performance metrics of the currently-selected antenna, (iii-a) selecting the other antenna and (iii-b) controlling the switching circuitry 246 (e.g., any of the switching circuitry 246 configurations disclosed herein) to connect the transceiver 364 to the selected other antenna. In some embodiments, the corresponding antenna switching policy includes the headphone continuing to reassess wireless metrics for the first and second antennas in an on-going manner (e.g., every few seconds to every few minutes) and switching between receiving WI-FI signals via one of the first or second antennas based on the wireless performance metrics.

In addition to different operating modes based on the type of wireless protocol (e.g., BLUETOOTH vs. WI-FI wireless protocols), the headphones in some embodiments may additionally or alternatively be configured for different operating modes (with different corresponding antenna switching policies) based on the type of media content that the headphones are playing. For example, the headphones may be configured for: (i) an operating mode for listening to audio from an audio source (via BLUETOOTH or WI-FI) in a standalone configuration (i.e., audio playback not synchronized with another device), (ii) an operating mode for listening to music from a music source in synchrony with one or more additional headphones or other playback devices (via BLUETOOTH or WI-FI), or (iii) an operating mode for listening to home theater or surround sound audio in synchrony with playback of video corresponding to the home theater or surround sound audio by a television or other display device (via BLUETOOTH or WI-FI).

In some embodiments, when the mode of operation is for listening to audio from an audio source (via BLUETOOTH or WI-FI) in a standalone manner (i.e., without synchronizing the playback of the audio with playback of audio or video by another playback device), selectively coupling either a first antenna at least partially disposed in the first earpiece or a second antenna at least partially disposed in the second earpiece to communication circuitry in accordance with a first antenna switching policy a block 706 includes one or more of the following: (i) when first entering the standalone mode of operation, determining which of the first or second antenna has better wireless performance metrics (e.g., higher signal strength, greater SNR, lower packet loss) based on an initial wireless signal assessment, (ii) selecting, from the first and second antennas, the antenna having the better wireless performance metrics, and (iii) controlling the switching circuitry 246 to connect the transceiver 364 to the selected antenna.

In some standalone modes of operation (e.g., some standalone BLUETOOTH modes of operation), the headphone is configured to continue receiving wireless signals via the initially-selected antenna during the duration of a listening session. But in some standalone modes of operation (e.g., some standalone WI-FI modes of operation), the headphone is configured to continue receiving wireless signals via the initially-selected antenna for some comparatively long duration of time, e.g., a few minutes, before performing further functions comprising (i) determining which of the first or second antenna has better wireless performance metrics (e.g., higher signal strength, greater SNR, lower packet loss) based on a wireless signal assessment, (ii) in response to determining that the wireless performance metrics for the currently selected antenna are better (or in some embodiments, not worse by some threshold amount, e.g., worse by 10%, 20%, or some other suitable threshold) than the wireless performance metrics of the non-selected antenna, continuing to receive wireless signals via the selected antenna, or (iii) in response to determining that the wireless performance metrics for the non-selected antenna are better (or in some embodiments, better by some threshold amount, e.g., better by 10%, 20%, or some other suitable threshold) than the wireless performance metrics of the currently-selected antenna, (iii-a) selecting the other antenna and (iii-b) controlling the switching circuitry 246 to connect the transceiver 364 to the selected other antenna.

In other examples, in some embodiments, when the mode of operation is for playing audio from an audio source (via BLUETOOTH or WI-FI) in synchrony with playback of audio or video by another playback device, selectively coupling either a first antenna at least partially disposed in the first earpiece or a second antenna at least partially disposed in the second earpiece to communication circuitry in accordance with a first antenna switching policy a block 706 includes one or more of the following: (i) when first entering the synchronized mode of operation, determining which of the first or second antenna has better wireless performance metrics (e.g., higher signal strength, greater SNR, lower packet loss) based on an initial wireless signal assessment, (ii) selecting, from the first and second antennas, the antenna having the better wireless performance metrics, and (iii) controlling the switching circuitry 246 to connect the transceiver 364 to the selected antenna.

In some synchronized modes of operation (e.g., a home theater mode), the headphone is configured to continue receiving wireless signals via the initially-selected antenna for some comparatively short duration of time (e.g. between about 10 ms and a few seconds, between about 10 ms and 1 second, between about 10-500 ms, between about 10-100 ms, or between about 10-50 ms), before again performing the functions of (i) determining which of the first or second antenna has better wireless performance metrics (e.g., higher signal strength, greater SNR, lower packet loss) based on a wireless signal assessment, (ii) in response to determining that the wireless performance metrics for the currently selected antenna are better (or in some embodiments, not worse by some threshold amount, e.g., worse by 10%, 20%, or some other suitable threshold) than the wireless performance metrics of the non-selected antenna, continuing to receive wireless signals via the selected antenna, or (iii) in response to determining that the wireless performance metrics for the non-selected antenna are better (or in some embodiments, better by some threshold amount, e.g., better by 10%, 20%, or some other suitable threshold) than the wireless performance metrics of the currently-selected antenna, (iii-a) selecting the other antenna and (iii-b) controlling the switching circuitry 246 to connect the transceiver 364 to the selected other antenna. In operation, in some synchronized modes of operation, the headphone may assess wireless metrics for the first and second antennas in an on-going manner (e.g. between about 10 ms and a few seconds, between about 10 ms and 1 second, between about 10-500 ms, between about 10-100 ms, or between about 10-50 ms) and switch between receiving wireless signals via one of the first or second antennas based on which of the two antennas have the better wireless performance metrics.

At block 708, method 700 further includes, while the current mode of operation is the second mode of operation, selectively coupling either the first antenna or the second antenna to the communication circuitry in accordance with a second antenna switching policy that is different from the first antenna switching policy. In some embodiments, the headphone may switch from operating in the first mode of operation to operating in the second mode of operation in response to (i) switching from receiving audio content via BLUETOOTH to receiving audio content via 2.4 GHz or 5.0 GHz WI-FI (or vice versa), and/or (ii) switching from operating in a standalone mode (not playing audio content in synchrony with another device) to operating in a paired mode (playing the audio content in synchrony with one or both of (i) a video device's playback of video content corresponding to the audio content and/or (ii) a second playback device's playback of the audio content). Because each mode of operation has its own corresponding antenna switching policy, switching from operating in the first mode of operation to operating in the second mode of operation results in the headphone switching from implementing a first antenna switching policy to implementing a second antenna switching policy.

In some embodiments, as part of implementing the second antenna switching policy, block 708 may include measuring at least one performance parameter during a first duration of time while wirelessly communicating with the at least one external device using the first antenna. Further, block 708 may include determining whether the at least one performance parameter measured during the first duration of time is outside a first operating range and causing the switching circuitry to couple the second antenna to the communication circuitry responsive to determining that the at least one performance parameter measured during the first duration of time is outside the first operating range.

Additionally, in some embodiments, block 708 may include measuring the at least one performance parameter during a second duration of time while wirelessly communicating with the at least one external device using the first antenna, wherein the second duration of time is longer than the first duration of time. Further, block 708 may include determining whether the at least one performance parameter measured during the second duration of time is outside a second operating range and causing the switching circuitry to couple the second antenna to the communication circuitry responsive to determining that the at least one performance metric measured during the second duration of time is outside the second operating range.

For example, in operation, while implementing the second antenna switching policy in some embodiments, block 708 includes one or more of the following: (i) measuring one or more wireless performance metrics of the first antenna and the second antenna, and (ii) selectively switching between receiving audio content via one or the first antenna or the second antenna based on which of the first or second antennas have the better wireless performance metrics. In some embodiments, the headphone, while operating in the second operating mode, is configured to selectively switch between the first and second antennas based on wireless performance metrics in block 708 in a way that is different in at least one or more respects than the headphone, while operating in the first operating mode, is configured to selectively switch between the first and second antennas based on wireless performance metrics.

In one example embodiment, when the first mode of operation of the headphone is for listening to audio from an audio source (via BLUETOOTH or WI-FI) in a standalone manner (i.e., without synchronizing the playback of the audio with playback of audio or video by another playback device), the headphone is configured to implement the first antenna switching policy comprising (i) when first entering the standalone mode of operation, determining which of the first or second antenna has better wireless performance metrics (e.g., higher signal strength, greater SNR, lower packet loss) based on an initial wireless signal assessment, (ii) selecting, from the first and second antennas, the antenna having the better wireless performance metrics, (iii) controlling the switching circuitry 246 to connect the transceiver 364 to the selected antenna, and (iv) continuing to receive audio data via the selected antenna for the duration of the listening session.

And after switching from operating in the first operating mode (the standalone BLUETOOTH mode) to operating in a second operating mode (e.g., a synchronized WI-FI mode of operation for playing home theater audio), the headphone is configured to implement the second antenna switching policy comprising (i) determining which of the first or second antenna has better wireless performance metrics (e.g., higher signal strength, greater SNR, lower packet loss) based on a wireless signal assessment, (ii) in response to determining that the wireless performance metrics for the currently selected antenna are better (or in some embodiments, not worse by some threshold amount, e.g., worse by 10%, 20%, or some other suitable threshold) than the wireless performance metrics of the non-selected antenna, continuing to receive wireless signals via the selected antenna, (iii) in response to determining that the wireless performance metrics for the non-selected antenna are better (or in some embodiments, better by some threshold amount, e.g., better by 10%, 20%, or some other suitable threshold) than the wireless performance metrics of the currently-selected antenna, (iii-a) selecting the other antenna and (iii-b) controlling the switching circuitry 246 to connect the transceiver 364 to the selected other antenna, and (iv) after some duration of time (e.g. between about 10 ms and a few seconds, between about 10 ms and 1 second, between about 10-500 ms, between about 10-100 ms, or between about 10-50 ms) repeating steps (i) through (iv).

The above-described example illustrates an embodiment where the first mode of operation is the standalone BLUETOOTH mode of operation and the second mode of operation is the synchronized WI-FI home theater mode of operation, persons of skill in the art would readily recognize that the first and second modes of operation could be any two different modes of operation disclosed herein.

VII. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

It should be appreciated that the spatial antenna diversity techniques may be readily applied to devices separate and apart from playback devices and/or NMDs. For example, the techniques described herein may be employed in wearable devices separate and apart from headphone devices such as a pair of smart glasses. Implementing a robust communication system in a pair of smart glasses may present similar problems to those described above with respect to headphones (e.g., close proximity to the human head during use). Accordingly, the spatial antenna diversity techniques described herein may be readily applied to offer improved wireless performance. In such a smart glasses implementation, the smart glasses may comprise a housing including a frame front (e.g., configured to hold one or more lenses), a first temple rotatably coupled to the frame front, and a second temple rotatable coupled to the frame front. The antenna 244a may be at least partially disposed in the first temple (e.g., disposed on a first side of a subject's head during use) and the antenna 244b may be at least partially disposed in the second temple (e.g., disposed on a second side of the subject's head that is opposite the first side during use). The communication circuitry 247 and/or the switching circuitry 246 may be disposed in the housing in any suitable manner (e.g., disposed in the frame front, disposed in the left temple, disposed in the right temple, distributed between the frame front and the temples, etc.).

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VIII. Example Features (Feature 1) A headphone device comprising: a housing comprising a first earpiece and a second earpiece; a first antenna at least partially disposed in the first earpiece; a second antenna at least partially disposed in the second earpiece; switching circuitry coupled to the first antenna and the second antenna, wherein the switching circuitry comprises a common port and wherein the switching circuitry is configured to selectively couple the common port to either the first antenna or the second antenna; communication circuitry coupled to the common port of the switching circuit, wherein the communication circuitry is configured to: identify a current mode of operation from a plurality of modes of operation including a first mode of operation and a second mode of operation; cause the headphone device to wirelessly communicate with at least one external device based at least in part on the current mode of operation, wherein causing the headphone device to wirelessly communicate comprises: while the current mode of operation is the first mode of operation, causing the switching circuitry to selectively couple either the first antenna or the second antenna to the common port in accordance with a first antenna switching policy; and while the current mode of operation is the second mode of operation, causing the switching circuitry to selectively couple either the first antenna or the second antenna to the common port in accordance with a second antenna switching policy that is different from the first antenna switching policy.

(Feature 2) The headphone device of feature 1, wherein the first operation mode is a WI-FI operation mode where the headphone device wirelessly communicates with the at least one external device over a 2.4 Gigahertz (GHz) WI-FI communication link or a 5 GHz communication link and wherein the second operation mode is a BLUETOOTH operation mode where the headphone device wirelessly communicates with the at least one external device over a BLUETOOTH communication link.

(Feature 3) The headphone device of feature 1, wherein the first mode is a synchronized playback mode where headphone device plays back audio content that is synchronized with content output by another device and the second mode is a non-synchronized playback mode where the headphone device plays back audio content that is not synchronized with content output by the other device.

(Feature 4) The headphone device of any of features 1-3, further comprising at least one processor coupled to the communication circuitry and wherein the communication circuitry is further configured to: receive one or more messages from the at least one processor indicative of the current mode of operation; and identify the current mode of operation from the plurality of operating modes based on the one or more messages from the at least one processor.

(Feature 5) The headphone device of any of features 1-4, wherein causing the switching circuitry to selectively couple either the first antenna or the second antenna to the common port in accordance with the first antenna switching policy comprises: measuring at least one performance parameter during a first duration of time while wirelessly communicating with the at least one external device using the first antenna; determining whether the at least one performance parameter measured during the first duration of time is outside a first operating range; and causing the switching circuitry to couple the second antenna to the common port responsive to determining that the at least one performance parameter measured during the first duration of time is outside the first operating range.

(Feature 6) The headphone device of feature 5, wherein causing the switching circuitry to selectively couple either the first antenna or the second antenna to the common port in accordance with the second antenna switching policy comprises: measuring the at least one performance parameter during a second duration of time while wirelessly communicating with the at least one external device using the first antenna, wherein the second duration of time is longer than the first duration of time; determining whether the at least one performance parameter measured during the second duration of time is outside a second operating range; and causing the switching circuitry to couple the second antenna to the common port responsive to determining that the at least one performance metric measured during the second duration of time is outside the second operating range.

(Feature 7) The headphone device of any of features 1-6, wherein the housing further comprises a headband, wherein the first earpiece comprises a first member attached to the headband and a second member that pivots about an axis relative to the first member and wherein the first antenna is at least partially disposed on the axis.

(Feature 8) The headphone device of any of features 1-6, wherein a portion of the first earpiece is rotatable about an axis, and wherein the first antenna is at least partially disposed in the first earpiece such that a position of the first antenna relative to a wearer's head is substantially independent of rotation of the portion of the first earpiece about the axis.

(Feature 9) The headphone device of any of features 1-8, wherein the switching circuitry is at least partially disposed in the first earpiece and wherein the headphone device further comprises a first transducer at least partially disposed in the first earpiece, a second transducer at least partially disposed in the second earpiece, an audio amplifier at least partially disposed in the first earpiece, and a cable assembly.

(Feature 10) The headphone device of feature 9, wherein the cable assembly comprises: a coaxial cable that couples the second antenna to the switching circuitry; and one or more conductors that couple the second transducer to the audio amplifier.

(Feature 11) The headphone device of feature 10, wherein the cable assembly comprises an outer jacket, wherein the coaxial cable is at least partially disposed within the outer jacket, and wherein the one or more conductors are at least partially disposed between the coaxial cable and the outer jacket.

(Feature 12) The headphone device of any of features 1-11, wherein the communication circuitry comprises a wireless transceiver and wherein the headphone device further comprises: an amplifier coupled between the common port of a switch and the wireless transceiver; a bypass-switch coupled in parallel with the amplifier; and a surface acoustic wave filter coupled between the amplifier and the wireless transceiver.

(Feature 13) The headphone device of any of features 1-12, wherein the first antenna is a first passive multi-band antenna and wherein the second antenna is a second passive multi-band antenna.

(Feature 14) The headphone device of any of features 1-13, wherein the housing is selected from a group consisting of: an over-ear housing, an on-ear housing, and an in-ear housing.

(Feature 15) A method of operating a headphone device comprising a first earpiece and a second earpiece, the method comprising: identifying a current mode of operation from a plurality of modes of operation including a first mode of operation and a second mode of operation that is different from the first mode of operation; wirelessly communicating with at least one external device based on the current mode of operation, wherein wirelessly communicating with the at least one external device comprises: while the current mode of operation is the first mode of operation, selectively coupling either a first antenna at least partially disposed in the first earpiece or a second antenna at least partially disposed in the second earpiece to communication circuitry in accordance with a first antenna switching policy; and while the current mode of operation is the second mode of operation, selectively coupling either the first antenna or the second antenna to the communication circuitry in accordance with a second antenna switching policy that is different from the first antenna switching policy.

(Feature 16) The method of feature 15, wherein selectively coupling either the first antenna or the second antenna to the communication circuitry in accordance with the first antenna switching policy comprises: measuring at least one performance parameter during a first duration of time while wirelessly communicating with the at least one external device using the first antenna; determining whether the at least one performance parameter measured during the first duration of time is outside a first operating range; and causing the switching circuitry to couple the second antenna to the communication circuitry responsive to determining that the at least one performance parameter measured during the first duration of time is outside the first operating range.

(Feature 17) The method of feature 16, wherein selectively coupling either the first antenna or the second antenna to the communication circuitry in accordance with the second antenna switching policy comprises: measuring the at least one performance parameter during a second duration of time while wirelessly communicating with the at least one external device using the first antenna, wherein the second duration of time is longer than the first duration of time; determining whether the at least one performance parameter measured during the second duration of time is outside a second operating range; and causing the switching circuitry to couple the second antenna to the communication circuitry responsive to determining that the at least one performance metric measured during the second duration of time is outside the second operating range.

(Feature 18) A wearable device comprising: a housing configured to be worn about a head of a subject; a plurality of antennas comprising a first antenna at least partially disposed in the housing and a second antenna at least partially disposed in the housing, wherein the first antenna is disposed on a first side of the subject when the wearable device is worn about the head, and wherein the second antenna is disposed on a second side of the subject that is opposite the first side when the wearable device is worn about the head; switching circuitry coupled to the plurality of antennas, wherein the switching circuitry comprises a common port and wherein the switching circuitry is configured to selectively couple one antenna from the plurality of antennas to the common port; communication circuitry coupled to the common port of the switching circuit, wherein the communication circuitry is configured to: identify a current mode of operation from a plurality of modes of operation including a first mode of operation and a second mode of operation that is different from the first mode of operation; cause the headphone device to wirelessly communicate with at least one external device based at least in part on the current mode of operation, wherein causing the headphone device to wirelessly communicate comprises: while the current mode of operation is the first mode of operation, causing the switching circuitry to selectively couple one antenna from the plurality of antennas to the common port in accordance with a first antenna switching policy; and while the current mode of operation is the second mode of operation, causing the switching circuitry to selectively couple one antenna from the plurality of antennas to the common port in accordance with a second antenna switching policy that is different from the first antenna switching policy.

(Feature 19) The wearable device of feature 18, wherein the wearable device is a headphone device and wherein the housing is selected from the group consisting of: an over-ear housing, an on-ear housing, and an in-ear housing.

(Feature 20) The wearable device of feature 18, wherein the housing further comprises a first earpiece, a second earpiece, a headband attached to the first earpiece and the second earpiece and wherein the first antenna is at least partially disposed in the headband.

(Feature 21) The wearable device of feature 18, wherein the wearable device is a pair of smart glasses and wherein the housing comprises a frame front, a first temple rotatably coupled to the frame front, and a second temple rotatable coupled to the frame front.

(Feature 22) The wearable device of feature 21, wherein the first antenna is at least partially disposed in the first temple and the second antenna is at least partially disposed in the second temple.

(Feature 23) A headphone device comprising: a first earpiece; a second earpiece; a headband attached to the first earpiece and the second earpiece; a communication circuitry at least partially housed by the first earpiece; a first antenna at least partially housed by the first earpiece, wherein the first antenna is coupled to the communication circuit; a transducer at least partially housed by the second earpiece; a second antenna at least partially housed by the second earpiece; and a cable assembly at least partially housed by the headband, wherein the cable assembly comprises a plurality of conductors including: one or more first conductors that couple the second antenna to the communication circuit; and one or more second conductors that couple the transducer to at least one electronic component at least partially housed in the first earpiece.

(Feature 24) The headphone device of feature 23, wherein the cable assembly comprises a coaxial cable including the one or more first conductors.

(Feature 25) The headphone device of feature 24, wherein the cable assembly is a single cable bundle comprising an outer jacket and wherein the coaxial cable is an inner coaxial cable disposed at least partially within the outer jacket.

(Feature 26) The headphone device of feature 25, wherein the one or more second conductors are disposed at least partially between the inner coaxial cable and the outer jacket.

(Feature 27) The headphone device of any of features 25 and 26, wherein the outer cable jacket has an outer diameter between 2.5 millimeters and 4.5 millimeters.

(Feature 28) The headphone device of feature 23, wherein the cable assembly comprises a first cable and a second cable, wherein the one or more first conductors are integrated into the first cable and the one or more second conductors are integrated into the second cable.

(Feature 29) The headphone device of any of features 23-28, wherein the cable assembly has a length between 400 millimeters and 600 millimeters.

(Feature 30) The headphone device of any of features 23-29, wherein the plurality of conductors consists of between 14 conductors and 22 conductors.

(Feature 31) The headphone device of any of features 23-30, wherein at least some of the plurality of conductors are stranded conductors.

(Feature 32) The headphone device of any of features 23-31, wherein the plurality of conductors further includes two conductors arranged in a twisted pair.

(Feature 33) The headphone device of any of features 23-32, wherein the headphone device is an on-ear headphone device or an over-ear headphone device.

(Feature 34) A headphone device comprising: a first earpiece; a second earpiece; a headband attached to the first earpiece and the second earpiece; a wireless transceiver at least partially housed by the first earpiece; a first antenna at least partially housed by the first earpiece, wherein the first antenna is coupled to the wireless transceiver; a transducer at least partially housed by the second earpiece; a second antenna at least partially housed by the second earpiece; a cable assembly at least partially housed by the headband; and a first splitter comprising a first port coupled to the first antenna, a second port coupled to the second antenna, and a third port coupled to the wireless transceiver.

(Feature 35) The headphone device of feature 34, further comprising a second splitter comprising a first port coupled to the first antenna, a second port coupled to the second antenna, and a third port coupled to the wireless transceiver.

(Feature 36) The headphone device of feature 35, wherein the first splitter has a different construction than the second splitter.

(Feature 37) A headphone device comprising: a housing comprising a first earpiece, a second earpiece, and a headband attached to the first earpiece and the second earpiece, wherein the first earpiece comprises a first member and a second member, wherein the second member is attached to the headband and the first member pivots about an axis relative to the second member; a first antenna at least partially housed by the first earpiece, wherein the first antenna is at least partially disposed on the axis; and a second antenna at least partially housed by the second earpiece.

(Feature 38) The headphone device of feature 37, wherein at least one of the first antenna or the second antenna is a passive multi-band antenna.

(Feature 39) The headphone device of feature 37, wherein at least one of the first antenna or the second antenna is an active multi-band antenna.

(Feature 40) The headphone device of any of features 37-39, wherein the first antenna is at least partially disposed in the first member.

(Feature 41) A playback device comprising: a wireless transceiver; a first antenna; and a second antenna; a first splitter comprising a first port coupled to the first antenna, a second port coupled to the second antenna, and a third port coupled to the wireless transceiver; at least one audio amplifier configured to drive at least one transducer; at least one processor coupled to the wireless transceiver; at least one non-transitory computer-readable medium; and program instructions stored on the at least one non-transitory computer-readable medium that are executable by the at least one processor such that the playback device is configured to: after receipt of audio content via the wireless transceiver, playback the audio content using the at least one audio amplifier.

(Feature 42) The playback device of feature 41, further comprising a second splitter comprising a first port coupled to the first antenna, a second port coupled to the second antenna, and a third port coupled to the wireless transceiver.

(Feature 43) The playback device of feature 42, wherein the first splitter has a different construction than the second splitter.

(Feature 44) A playback device comprising: at least one audio amplifier configured to drive at least one transducer; at least one processor; a first antenna; a second antenna; switching circuitry coupled to the first antenna and the second antenna, wherein the switching circuitry comprises a common port and wherein the switching circuitry is configured to selectively couple the common port to either the first antenna or the second antenna; communication circuitry coupled to the at least one processor and to the common port of the switching circuit, wherein the communication circuitry is configured to cause the playback device to wirelessly communicate with at least one external device based at least in part on a current operation mode selected from a plurality of operation modes, wherein causing the playback device to wirelessly communicate comprises: while in a first operation mode of the plurality of operation modes, causing the switching circuitry to selectively couple either the first antenna or the second antenna to the common port in accordance with a first antenna switching policy; and while in a second operation mode of the plurality of operation modes, causing the switching circuitry to selectively couple either the first antenna or the second antenna to the common port in accordance with a second antenna switching policy that is different from the first antenna switching policy; at least one non-transitory computer-readable medium; and program instructions stored on the at least one non-transitory computer-readable medium that are executable by the at least one processor such that the playback device is configured to: after receipt of audio content via the communication circuitry, playback the audio content using the at least one audio amplifier.

(Feature 45) A headphone device comprising: a first earpiece; a second earpiece; a first antenna at least partially disposed in the first earpiece; a second antenna at least partially disposed in the second earpiece; switching circuitry coupled to the first antenna and the second antenna, wherein the switching circuitry comprises a common port and wherein the switching circuitry is configured to selectively couple the common port to either the first antenna or the second antenna; communication circuitry coupled to the common port of the switching circuit, wherein the communication circuitry is configured to cause the headphone device to wirelessly communicate with at least one external device based at least in part on a current operation mode (e.g., a current operation mode of the headphone device and/or one or more components of the headphone device such as the communication circuitry) from a plurality of operation modes, wherein causing the headphone device to wirelessly communicate comprises: while the current operation mode is a first operation mode of the plurality of operation modes, causing the switching circuitry to selectively couple either the first antenna or the second antenna to the common port in accordance with a first antenna switching policy; and while the current operation mode is a second operation mode of the plurality of operation modes, causing the switching circuitry to selectively couple either the first antenna or the second antenna to the common port in accordance with a second antenna switching policy that is different from the first antenna switching policy.

(Feature 46) The headphone device of feature 45, wherein the first operation mode is a WI-FI operation mode where the headphone device wirelessly communicates with the at least one external device over a 2.4 Gigahertz (GHz) WI-FI communication link or a 5 GHz communication link and wherein the second operation mode is a BLUETOOTH operation mode where the headphone device wirelessly communicates with the at least one external device over a BLUETOOTH communication link.

(Feature 47) The headphone device of feature 45, wherein the first operation mode is a synchronized playback mode where headphone device plays back audio content that is synchronized with content output by another device and the second operation mode is a non-synchronized playback mode where the headphone plays back audio content that is not synchronized with content output by the other device.

(Feature 48) The headphone device of feature 45, further comprising at least one processor coupled to the communication circuitry and wherein the communication circuitry is further configured to receive one or more messages from the at least one processor indicative of the current operation mode and identify the current operation mode from the plurality of operating modes based on the one or more messages from the at least one processor.

(Feature 49) The headphone device of feature 45, wherein causing the switching circuitry to selectively couple either the first antenna or the second antenna to the common port in accordance with the first antenna switching policy comprises: measuring at least one performance parameter during a first duration of time while wirelessly communicating with the at least one external device using the first antenna; determining whether the at least one performance parameter measured during the first duration of time is outside a first operating range; and causing the switching circuitry to couple the second antenna to the common port when the at least one performance parameter measured during the first duration of time is outside the first operating range.

(Feature 50) The headphone device of feature 49, wherein causing the switching circuitry to selectively couple either the first antenna or the second antenna to the common port in accordance with the second antenna switching policy comprises: measuring the at least one performance parameter during a second duration of time while wirelessly communicating with the at least one external device using the first antenna, wherein the second duration of time is longer than the first duration of time; determining whether the at least one performance parameter measured during the second duration of time is outside a second operating range; and causing the switching circuitry to couple the second antenna to the common port when the at least one performance metric measured during the second duration of time is outside the second operating range.

(Feature 51) The headphone device of feature 45, further comprising a headband, wherein the first earpiece comprises a first member attached to the headband and a second member that pivots about an axis relative to the first member and wherein the first antenna is at least partially disposed on the axis.

(Feature 52) The headphone device of feature 45, wherein a portion of the first earpiece is rotatable about an axis, and wherein the first antenna is at least partially disposed in the first earpiece such that a position of the first antenna relative to a head of a wearer is substantially independent of rotation of the portion of the first earpiece about the axis.

(Feature 53) The headphone device of feature 45, wherein the switching circuitry is at least partially disposed in the first earpiece and wherein the headphone device further comprises: a first transducer at least partially disposed in the first earpiece; a second transducer at least partially disposed in the second earpiece; an audio amplifier at least partially disposed in the first earpiece; and a cable assembly.

(Feature 54) The headphone device of feature 53, wherein the cable assembly comprises: a coaxial cable that couples the second antenna to the switching circuitry; and one or more conductors that couple the second transducer to the audio amplifier.

(Feature 55) The headphone device of feature 54, wherein the cable assembly comprises an outer jacket, wherein the coaxial cable is at least partially disposed within the outer jacket, and wherein the one or more conductors are at least partially disposed between the coaxial cable and the outer jacket.

(Feature 56) The headphone device of feature 45, wherein the communication circuitry comprises: a wireless transceiver (e.g., a combined BLUETOOTH and WI-FI transceiver); an amplifier coupled between the common port of a switch and the wireless transceiver; a bypass-switch coupled in parallel with the amplifier; and a first filter (e.g., surface acoustic wave (SAW) filter) coupled between the amplifier and the wireless transceiver.

(Feature 57) The headphone device of feature 56, wherein the communication circuitry further comprises: a switch having a first port coupled to the wireless transceiver, a second port coupled to the amplifier, and a third port coupled to the common port of the switching circuitry; and a second filter (e.g., a band-pass filter (BPF)) coupled between the wireless transceiver and the first port of the switch.

(Feature 58) The headphone device of feature 45, wherein at least one of the first antenna or the second antenna comprises a passive antenna (e.g., a passive multi-band antenna or a passive single-band antenna).

(Feature 59) A method of operating a headphone device comprising a first earpiece and a second earpiece, the method comprising: wirelessly communicating with at least one external device to obtain audio content based on a current operation mode from a plurality of operation modes, wherein wirelessly communicating with the at least one external device comprises: while the current mode of operation is a first operation mode of the plurality of operation modes, selectively coupling either a first antenna at least partially disposed in the first earpiece or a second antenna at least partially disposed in the second earpiece to communication circuitry in accordance with a first antenna switching policy; and while the current mode of operation is a second operation mode of the plurality of operation modes, selectively coupling either the first antenna or the second antenna to the communication circuitry in accordance with a second antenna switching policy that is different from the first antenna switching policy; and playing back the audio content using a first transducer at least partially disposed in the first earpiece and a second transducer at least partially disposed in the second earpiece.

(Feature 60) The method of feature 59, wherein selectively coupling either the first antenna or the second antenna to the communication circuitry in accordance with the first antenna switching policy comprises: measuring at least one performance parameter during a first duration of time while wirelessly communicating with the at least one external device using the first antenna; determining whether the at least one performance parameter measured during the first duration of time is outside a first operating range; and causing the switching circuitry to couple the second antenna to the communication circuitry when the at least one performance parameter measured during the first duration of time is outside the first operating range.

(Feature 61) The method of feature 60, wherein selectively coupling either the first antenna or the second antenna to the communication circuitry in accordance with the second antenna switching policy comprises: measuring the at least one performance parameter during a second duration of time while wirelessly communicating with the at least one external device using the first antenna, wherein the second duration of time is longer than the first duration of time; determining whether the at least one performance parameter measured during the second duration of time is outside a second operating range; and causing the switching circuitry to couple the second antenna to the communication circuitry when the at least one performance metric measured during the second duration of time is outside the second operating range.

(Feature 62) A wearable device comprising: a housing configured to be worn about a head of a subject; a first antenna at least partially disposed in the housing, wherein the first antenna is disposed on a first side of the subject when the wearable device is worn about the head; a second antenna at least partially disposed in the housing, wherein the second antenna is disposed on a second side of the subject that is opposite the first side when the wearable device is worn about the head; switching circuitry coupled to the first antenna and the second antenna, wherein the switching circuitry comprises a common port and wherein the switching circuitry is configured to selectively couple either the first antenna or the second antenna to the common port; communication circuitry coupled to the common port of the switching circuit, wherein the communication circuitry is configured to cause the headphone device to wirelessly communicate with at least one external device based at least in part on a current operation mode from a plurality of operation modes, wherein causing the headphone device to wirelessly communicate comprises: while the current operation mode is a first operation mode of the plurality of operation modes, causing the switching circuitry to selectively couple either the first antenna or the second antenna to the common port in accordance with a first antenna switching policy; and while the current operation mode is a second operation mode of the plurality of operation modes, causing the switching circuitry to selectively couple either the first antenna or the second antenna to the common port in accordance with a second antenna switching policy that is different from the first antenna switching policy.

(Feature 63) The wearable device of feature 62, wherein the wearable device is a headphone device and wherein the housing is one of: an over-ear housing, an on-ear housing, or an in-ear housing.

(Feature 64) The wearable device of feature 62, wherein the housing further comprises a first earpiece, a second earpiece, a headband attached to the first earpiece and the second earpiece and wherein the first antenna is at least partially disposed in the headband.

(Feature 65) A headphone device comprising: a headband; a first earpiece attached to the headband, wherein at least a portion of the first earpiece is rotatable about an axis (e.g., relative to the headband); a second earpiece attached to the headband; a first transducer at least partially disposed in the first earpiece; a second transducer at least partially disposed in the second earpiece; an antenna at least partially disposed in the first earpiece, wherein at least a portion of the antenna is disposed on the axis; communication circuitry coupled to the antenna and configured to facilitate communication via one or more data networks; at least one processor coupled to the communication circuitry; at least one non-transitory computer readable medium; program instructions stored on the at least one non-transitory computer-readable medium that are executable by the at least one processor such that the headphone device is configured to: after receipt of audio content via the one or more data networks, playback the audio content using the first and second transducers.

(Feature 66) The headphone device of feature 65, wherein the first earpiece comprises a first member attached to the headband and a second member that pivots about the axis.

(Feature 67) A headphone device comprising: a headband; a first earpiece attached to the headband, wherein at least a portion of the first earpiece is rotatable about an axis; a second earpiece attached to the headband; a first transducer at least partially disposed in the first earpiece; a second transducer at least partially disposed in the second earpiece; an antenna at least partially disposed in the first earpiece, wherein the antenna is at least partially disposed in the first earpiece such that a position of the antenna relative to a head of a wearer is substantially independent of rotation of the at least the portion of the first earpiece about the axis; communication circuitry coupled to the antenna and configured to facilitate communication via one or more data networks; at least one processor coupled to the communication circuitry; at least one non-transitory computer readable medium; program instructions stored on the at least one non-transitory computer-readable medium that are executable by the at least one processor such that the headphone device is configured to: after receipt of audio content via the one or more data networks, playback the audio content using the first and second transducers.

What is claimed is:

1. A headphone device comprising:
a headband;
a first earpiece coupled to the headband and at least partially housing a first plurality of electrical components, wherein the first plurality of electrical components comprises:
a first transducer;
a first antenna;
a second antenna;
a third antenna;
communication circuitry coupled to the first, second, and third antennas and configured to facilitate wireless communication using a plurality of communication protocols including a first communication protocol and a second communication protocol;
switching circuitry coupled between the communication circuitry and at least two of the first, second, or third antennas;
at least one processor; and
at least one computer readable medium storing instructions that when executed by the at least one processor cause the headphone device to:
operate in a first mode wherein the headphone device receives first audio content from an external device using the first communication protocol and renders the first audio content, wherein the switching circuitry is controlled in accordance with a first antenna switching policy; and
operate in a second mode wherein the headphone device receives second audio content from an external playback device using the second communication protocol and renders the second audio content in lip-synchrony with playback of visual content output by the external playback device, wherein the switching circuitry is controlled in accordance with a second antenna switching policy,
different from the first antenna switching policy, during receipt of the second audio content; and
a second earpiece coupled to the headband and at least partially housing a second plurality of electrical components, wherein the second plurality of electrical components comprises a second transducer.

2. The headphone device of claim 1, further comprising a cable assembly at least partially housed by the headband, wherein the cable assembly comprises:
a plurality of conductors including at least one conductor electrically coupling at least one electrical component of the first plurality of electrical components to at least one electrical component of the second plurality of electrical components; and
an outer jacket at least partially enclosing the plurality of conductors.

3. The headphone device of claim 1, wherein the switching circuitry includes a first port coupled to the first antenna, a second port coupled to the second antenna, and a common port coupled to the communication circuitry, wherein to operate in the second mode, the switching circuitry is configured to selectively couple the common port to either the first antenna or the second antenna in accordance with the second antenna switching policy, and the headphone device receives the second audio via one of the first antenna or the second antenna.

4. The headphone device of claim 3, wherein the first communication protocol is a BLUETOOTH protocol; and the second communication protocol is a WI-FI protocol.

5. The headphone device of claim 4, wherein to operate in the first mode, the headphone device receives the first audio content via the third antenna.

6. The headphone device of claim 5, wherein the communication circuitry includes a WI-FI transceiver coupled to the switching circuitry and a BLUETOOTH transceiver coupled to the third antenna.

7. The headphone device of claim 1, wherein the second plurality of electrical components further comprises a battery.

8. The headphone device of claim 1, wherein the first earpiece is rotatable about an axis relative to the headband.

9. The headphone device of claim 1, wherein at least one parameter of the second antenna switching policy is based on latency requirements of the second mode to maintain lip-synchrony between rendering of the second audio content and playback of the visual content.

10. The headphone device of claim 1, wherein the at least one computer readable medium further stores instructions that when executed by the at least one processor cause the headphone device to:
measure one or more performance parameters of at least two of the first, second, and third antenna
when operating in the first mode, repeat measurements of the one or more performance parameters with a first time interval between measurements specified by the first antenna switching policy; and
when operating in the second mode, repeat the measurements of the one or more performance parameters with a second time interval between measurements specified by the second antenna switching policy, the second time interval being shorter than the first time interval.

11. A headphone device comprising:
a headband;
a first earpiece coupled to the headband and at least partially housing a first plurality of electrical components, wherein the first plurality of electrical components comprises:
a first transducer;
a first antenna;
a second antenna;
a third antenna;
switching circuitry having a first port coupled to the first antenna, a second port coupled to the second antenna, and a common port, and wherein the switching circuitry is configured to selectively couple the common port to either the first antenna or the second antenna;
communication circuitry coupled to the common port of the switching circuitry and to the third antenna, wherein the communication circuitry is configured to facilitate wireless communication using a plurality of communication protocols;
at least one processor coupled to the communication circuitry; and
at least one computer readable medium storing instructions that when executed by the at least one processor cause the headphone device to:
operate in a first mode wherein the headphone device receives first audio content from a first external device, using a first communication protocol of the plurality of communication protocols, and renders the first audio content, and wherein the switching circuitry is controlled in accordance with a first antenna switching policy; and operate in a second mode wherein the headphone device receives second audio content from a second external device, using a second communication protocol of the plurality of communication protocols, and renders the second audio content in lip-synchrony with playback of visual content by an external video device in communication with the second external device, wherein receiving the second audio content includes controlling the switching circuitry to selectively couple either the first antenna or the second antenna to the common port in accordance with a second antenna switching policy different from the first antenna switching policy; and a second earpiece coupled to the headband and at least partially housing a second plurality of electrical components, wherein the second plurality of electrical components comprises a second transducer.

12. The headphone device of claim 11, further comprising a cable assembly at least partially housed by the headband, wherein the cable assembly comprises:

a plurality of conductors including at least one conductor electrically coupling at least one electrical component of the first plurality of electrical components to at least one electrical component of the second plurality of electrical components; and an outer jacket at least partially enclosing the plurality of conductors.

13. The headphone device of claim 11, wherein the first communication protocol is a BLUETOOTH protocol, and wherein the second communication protocol is a WI-FI protocol.

14. The headphone device of claim 11, wherein the second external device is a home theatre controller.

15. The headphone device of claim 11, wherein the second plurality of electrical components further comprises a battery.

16. The headphone device of claim 11, further comprising a user interface disposed at least partially within at least one of the first earpiece or the second earpiece, and wherein the at least one computer readable medium further stores instructions that when executed by the at least one processor cause the headphone device to select an operating mode from the first mode and the second mode based on an input received via the user interface.

17. A headphone device comprising:

a headband;

a first earpiece coupled to the headband and at least partially housing a first plurality of electrical components, wherein the first plurality of electrical components comprises:

a first transducer;

a first antenna;

a second antenna;

a third antenna;

communication circuitry coupled to the first, second, and third antennas, wherein the communication circuitry is configured to facilitate wireless communication using a plurality of communication protocols;

switching circuitry coupled between the communication circuitry and the first, second, and third antennas;

at least one processor coupled to the communication circuitry; and at least one computer readable medium storing instructions that when executed by the at least one processor cause the headphone device to:

operate in a first mode wherein the headphone device receives first audio content from a first external, device via the third antenna in accordance with a first antenna switching policy and using a first communication protocol of the plurality of communication protocols, and renders the first audio content; and operate in a second mode wherein the headphone device receives second audio content from a second external, device via at least one of the first and second antennas using a second communication protocol of the plurality of communication protocols, and renders the second audio content in lip-synchrony with playback of visual content by an external video device in communication with the second external device, wherein the switching circuitry is controlled in accordance with a second antenna switching policy, different from the first antenna switching policy, during receipt of the second audio content;

a second earpiece coupled to the headband and at least partially housing a second plurality of electrical components, wherein the second plurality of electrical components comprises a second transducer; and a cable assembly at least partially housed by the headband, wherein the cable assembly comprises at least one at least one conductor electrically coupling at least one electrical component of the first plurality of electrical components to at least one electrical component of the second plurality of electrical components.

18. The headphone device of claim 17, wherein the switching circuitry includes a first port coupled to the first antenna, a second port coupled to the second antenna, a third port coupled to the third antenna, and a common port coupled to the communication circuitry, and wherein the switching circuitry is configured to selectively couple the common port to one of the first antenna, the second antenna, or the third antenna.

19. The headphone device of claim 18, wherein, in accordance with the first antenna switching policy, the common port of the switching circuitry remains coupled to the third antenna for a duration of operation of the headphone device in the first mode.

20. The headphone device of claim 17, wherein the first communication protocol is a BLUETOOTH protocol and wherein the second communication protocol is a WI-FI protocol.

* * * * *